(12) United States Patent
Matsunaga et al.

(10) Patent No.: US 7,649,062 B2
(45) Date of Patent: Jan. 19, 2010

(54) SOLID TITANIUM CATALYST COMPONENT, CATALYST FOR POLYMERIZATION OF OLEFIN AND PROCESS FOR PRODUCING OLEFIN POLYMER

(75) Inventors: Kazuhisa Matsunaga, Otake (JP); Hisao Hashida, Yamaguchi (JP); Toshiyuki Tsutsui, Otake (JP); Kunio Yamamoto, Yamaguchi (JP); Atsushi Shibahara, Chiba (JP); Tetsunori Shinozaki, Otake (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 170 days.

(21) Appl. No.: 11/878,740

(22) Filed: Jul. 26, 2007

(65) Prior Publication Data

US 2008/0097050 A1  Apr. 24, 2008

Related U.S. Application Data

(63) Continuation-in-part of application No. 11/795,504, filed as application No. PCT/JP2006/300773 on Jan. 19, 2006.

(30) Foreign Application Priority Data

| Jan. 19, 2005 | (JP) | ............................ 2005-011512 |
| Jan. 19, 2005 | (JP) | ............................ 2005-011513 |
| Jan. 19, 2005 | (JP) | ............................ 2005-011514 |

(51) Int. Cl.
 C08F 4/42 (2006.01)
(52) U.S. Cl. ............... 526/124.3; 526/124.2; 526/142; 526/348; 502/103; 502/127; 502/132; 502/133
(58) Field of Classification Search .............. 506/124.2, 506/124.3, 142, 348; 502/103, 127, 132, 502/133
See application file for complete search history.

(56) References Cited

U.S. PATENT DOCUMENTS

| 4,725,656 | A | * | 2/1988 | Kashiwa et al. .......... 526/125.3 |
| 6,194,342 | B1 | | 2/2001 | Parodi et al. |
| 6,284,917 | B1 | | 9/2001 | Brunner et al. |
| 2004/0259721 | A1 | | 12/2004 | Matsunaga et al. |
| 2008/0125555 | A1 | | 5/2008 | Matsunaga et al. |
| 2008/0306228 | A1 | | 12/2008 | Matsunaga et al. |
| 2009/0069515 | A1 | | 3/2009 | Matsunaga et al. |

FOREIGN PATENT DOCUMENTS

| JP | 57-063310 A | 4/1982 |
| JP | 03-007703 A | 1/1991 |
| JP | 05-170843 A | 7/1993 |
| JP | 06-122716 A | 5/1994 |
| JP | 2001-114811 A | 4/2001 |
| JP | 2003-040918 A | 2/2003 |
| WO | WO 00/63261 A1 | 10/2000 |
| WO | WO 01/57099 A1 | 8/2001 |
| WO | WO 02/30998 A1 | 4/2002 |

OTHER PUBLICATIONS

Taiwanese Office Action dated Oct. 13, 2008.

* cited by examiner

*Primary Examiner*—Ling-Siu Choi
(74) *Attorney, Agent, or Firm*—Buchanan Ingersoll & Rooney PC

(57) ABSTRACT

A solid titanium catalyst component (I) of the present invention is characterized in that it contains titanium, magnesium, halogen, and a cyclic ester compound (a) represented by the following formula (1):

$$\text{(1)}\quad \underset{R\phantom{^1}\phantom{OOC}}{\overset{R^1OOC}{\diagdown}}\overset{R}{\underset{|}{C^a}}\!-\!\overset{R^2}{\underset{|}{C^a}}\!\overset{R}{\diagup}\!\cdots$$

wherein n is an integer of 5 to 10;
$R^2$ and $R^3$ are each independently $COOR^1$ or R, and at least one of $R^2$ and $R^3$ is $COOR^1$;
a single bond (excluding $C^a$—$C^a$ bonds, and a $C^a$—$C^b$ bond in the case where $R^3$ is R) in the cyclic backbone may be replaced with a double bond;
a plurality of $R^1$'s are each independently a monovalent hydrocarbon group having 1 to 20 carbon atoms; and
a plurality of R's are each independently a hydrogen atom or a substituent, but at least one of R's is not a hydrogen atom. When using this solid titanium catalyst component (I), an olefin polymer having a broad molecular weight distribution can be produced.

9 Claims, 4 Drawing Sheets

SOLID TITANIUM CATALYST COMPONENT, CATALYST FOR POLYMERIZATION OF OLEFIN AND PROCESS FOR PRODUCING OLEFIN POLYMER

TECHNICAL FIELD

The present invention relates to a solid titanium catalyst component which is preferably used for polymerization of an α-olefin having 3 or more carbon atoms, to a catalyst for olefin polymerization containing the solid titanium catalyst component, and to a process for producing an olefin polymer using the catalyst for olefin polymerization.

BACKGROUND OF THE INVENTION

As the catalysts for producing an olefin polymer such as a homopolymer of ethylene or an α-olefin, and a copolymer of ethylene and an α-olefin, the catalysts containing a titanium compound supported on magnesium halide in the active state have been conventionally known (hereinafter, the term "polymerization" may be described to encompass both of "homopolymerization" and "copolymerization").

As the catalyst for olefin polymerization, a catalyst containing titanium tetrachloride or titanium trichloride, which is called a Ziegler-Natta catalyst, a catalyst composed of a solid titanium catalyst component comprising magnesium, titanium, halogen and an electron donor, and an organometallic compound, and the like have been widely known.

The latter catalyst exhibits high activity in the polymerization of α-olefins such as propylene and butene-1, in addition to ethylene. Also, the obtained α-olefin polymer may have high stereoregularity.

It is reported that when among these catalysts, in particular, a catalyst comprising a solid titanium catalyst component having an electron donor, supported thereon, selected from carboxylic acid esters, typically exemplified by phthalic acid esters, and as a co-catalyst component, an aluminum-alkyl compound, and a silicon compound having at least one Si—OR (wherein R is a hydrocarbon group) is used, excellent polymerization activity and stereospecificity are exhibited in JP-A No. 57-63310 (Patent Document 1), etc.

The obtained polymers obtained by using the above-described catalyst often have narrower molecular weight distributions, as compared with the polymers obtained by using a Ziegler-Natta catalyst. It is known that the polymers having narrow molecular weight distributions tend to have "low melt flowability", "low melt tension", "poor moldability", "slightly low rigidity", or the like. On the other hand, from the standpoints of improvement of productivity, reduction in cost, or the like, various high speed molding technologies such as, for example, high speed stretching technologies aimed at improvement of productivity of the stretched film, have evolved.

When the polymers having relatively narrow molecular weight distributions as described above are to be stretched at a high speed, for example, the neck-in or flapping of the films may become more remarkable due to shortage of melt tension, and thus it becomes difficult to improve the productivity. Therefore, the polymers having higher melt tensions are demanded by the market.

In order to solve these problems, there have been many reports on a method for broadening the molecular weight distributions of the polymers by producing the polymers having different molecular weights by means of a multi-stage polymerization (JP-A No. 5-170843 (Patent Document 2)), a catalyst comprising plural kinds of electron donors (JP-A No. 3-7703 (Patent Document 3)), a catalyst using a succinic acid ester having an asymmetric carbon as the electron donor contained in the solid titanium catalyst component (pamphlet of International Publication WO 01/057099 (Patent Document 4), pamphlet of International Publication WO 00/63261 (Patent Document 5), pamphlet of International Publication WO 02/30998 (Patent Document 6)), and the like.

On the other hand, JP-A No. 2001-114811 (Patent Document 7) and JP-A No. 2003-40918 (Patent Document 8) disclose a solid catalyst component for olefin (s) polymerization, which is obtained by bringing into contact with a titanium compound, a magnesium compound and an electron-donating compound, and a catalyst for olefin(s) polymerization comprising the catalyst component. As the electron-donating compound, 1,2-cyclohexanedicarboxylic acid esters having a purity of the trans-isomers of 80% or more are used in the invention as described in Patent Document 7; and cyclohexenedicarboxylic acid diesters are used in the invention as described in Patent Document 8. As the specific example of these cyclohexenedicarboxylic acid diesters, 1-cyclohexene-dicarboxylic acid diester only is disclosed, in which the alkoxycarbonyl group is bonded to the 1-position and the 2-position of the cyclohexene ring of 1-cyclohexene (paragraphs [0021] to [0024], and Examples). However, Patent Documents 7 and 8 have no description on the molecular weight distributions of the olefin polymers.

[Patent Document 1] JP-A No. 57-63310
[Patent Document 2] JP-A No. 5-170843
[Patent Document 3] JP-A No. 3-7703
[Patent Document 4] Pamphlet of International Publication WO 01/057099
[Patent Document 5] Pamphlet of International Publication WO 00/63261
[Patent Document 6] Pamphlet of International Publication WO 02/30998
[Patent Document 7] JP-A No. 2001-114811
[Patent Document 8] JP-A No. 2003-40918

DISCLOSURE OF THE INVENTION

Problems to be Solved by the Invention

However, the above-described catalysts have been the catalysts which have an insufficient effect of broadening the molecular weight distribution of the olefin polymer, and according to the investigation conducted by the present inventors, broaden the molecular weight distribution by increasing the content of the low molecular weight components. On the other hand, as evaluated from the market, it cannot be said that the catalysts provide sufficient improvement of the melt tension of the olefin polymer. Further, from the viewpoint of reduction in the cost, appearance of a catalyst which makes it possible to produce an olefin polymer having a molecular weight distribution broadened by means of a simpler process is demanded by the market.

Therefore, it is an object of the present invention to provide a catalyst component and a catalyst which are capable of conveniently producing an olefin polymer having a broad molecular weight distribution and a high melt tension, and being suitable for high speed stretch and high speed molding.

Means for Solving the Problems

The present inventors have made extensive studies, and as a result, they found that by using a solid titanium catalyst component comprising a specific cyclic ester compound having a plurality of carboxylic acid ester groups, an olefin polymer having a broad molecular weight distribution can be prepared, thus completing the invention. In addition, Patent Documents 7 and 8 have neither description nor disclosure on a cyclic ester compound (a) having a substituent R, represented by the following formula (1).

The solid titanium catalyst component (I) of the invention is characterized in that it comprises titanium, magnesium, halogen, and a cyclic ester compound (a) specified by the following formula (1):

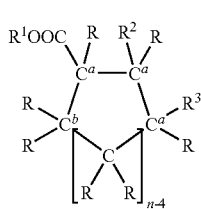

(1)

wherein n is an integer of 5 to 10;

$R^2$ and $R^3$ are each independently $COOR^1$ or R, and at least one of $R^2$ and $R^3$ is $COOR^1$;

a single bond (excluding $C^a$—$C^a$ bonds, and a $C^a$—$C^b$ bond in the case where $R^3$ is R) in the cyclic backbone may be replaced with a double bond;

a plurality of $R^1$'s are each independently a monovalent hydrocarbon group having 1 to 20 carbon atoms;

a plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, or they may be bonded to each other to form a ring, but at least one of R's is not a hydrogen atom; and a double bond may be contained in the backbone of the ring formed by the bonding of R's, and in the case where two or more $C^a$'s bonded with $COOR^1$ are contained in the backbone of the ring, the backbone of the ring have 5 to 10 carbon atoms.

In the formula (1), it is preferable that the bonds between the carbon atoms in the cyclic backbone are all single bonds.

In the formula (1), it is preferable that the cyclic backbone has 6 carbon atoms.

As the above-described cyclic ester compound (a), the compound represented by the following formula (1a) is preferable:

A solid titanium catalyst component (I), comprising titanium, magnesium, halogen, and a cyclic ester compound (a) represented by the following formula (1a):

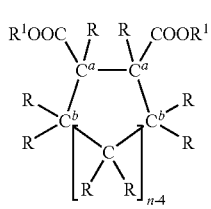

(1a)

wherein n is an integer of 5 to 10;

a single bond (excluding $C^a$—$C^a$ bonds and a $C^a$—$C^b$ bond) in the cyclic backbone may be replaced with a double bond;

a plurality of $R^1$'s are each independently a monovalent hydrocarbon group having 1 to 20 carbon atoms;

a plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, or they may be bonded to each other to form a ring, but at least one of R's bonding to $C^b$ is not a hydrogen atom; and a double bond may be contained in the backbone of the ring formed by the bonding of R's, and in the case where two $C^a$'s bonded with $COOR^1$ are contained in the backbone of the ring, the backbone of the ring have 5 to 10 carbon atoms.

As the above-described cyclic ester compound (a), the compound represented by the following formula (1b) is preferable:

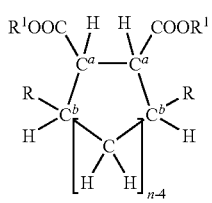

(1b)

wherein n is an integer of 5 to 10;

a single bond (excluding $C^a$—$C^a$ bonds and a $C^a$—$C^b$ bond) in the cyclic backbone may be replaced with a double bond;

a plurality of $R^1$'s are each independently a monovalent hydrocarbon group having 1 to 20 carbon atoms;

a plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, or they may be bonded to each other to form a ring, but at least one of R's bonding to $C^b$ is not a hydrogen atom; and a double bond may be contained in the backbone of the ring formed by the bonding of R's, and in the case where two $C^a$'s are contained in the backbone of the ring, the backbone of the ring have 5 to 10 carbon atoms.

The solid titanium catalyst component (I) of the invention may further comprise an aromatic carboxylic acid ester and/or a compound having two or more ether linkages through a plurality of carbon atoms.

The catalyst for olefin polymerization of the invention is characterized in that it comprises the solid titanium catalyst component (I) of claim 1 and an organometallic compound catalyst component (II) containing a metal element selected from Groups I, II and XIII of the periodic table.

The catalyst for olefin polymerization of the invention may further comprise an electron donor (III).

The process for producing an olefin polymer of the invention is characterized in that it comprises polymerizing an olefin in the presence of the catalyst for olefin polymerization.

The molded product of the invention is obtained by molding the olefin polymer produced by the process for producing an olefin polymer.

Effects of the Invention

The solid titanium catalyst component, the catalyst for olefin polymerization and the process for producing an olefin polymer of the invention are suitable for producing an olefin polymer having high stereoregularity and broad molecular weight distribution with high activity. In addition, it is advantageous in obtaining an olefin polymer having a broad molecular weight distribution, in which the change in melt flow rate values relative to the change in used amount of hydrogen is significant, in producing the olefin polymer.

Further, when the solid titanium catalyst component, the catalyst for olefin polymerization and the process for producing an olefin polymer of the invention are used, it can be expected that an olefin polymer, for example, having excellent rigidity, as well as the molding properties such as high speed stretchability and high speed moldability can be prepared.

BEST MODE FOR CARRYING OUT THE INVENTION

Figure 1:
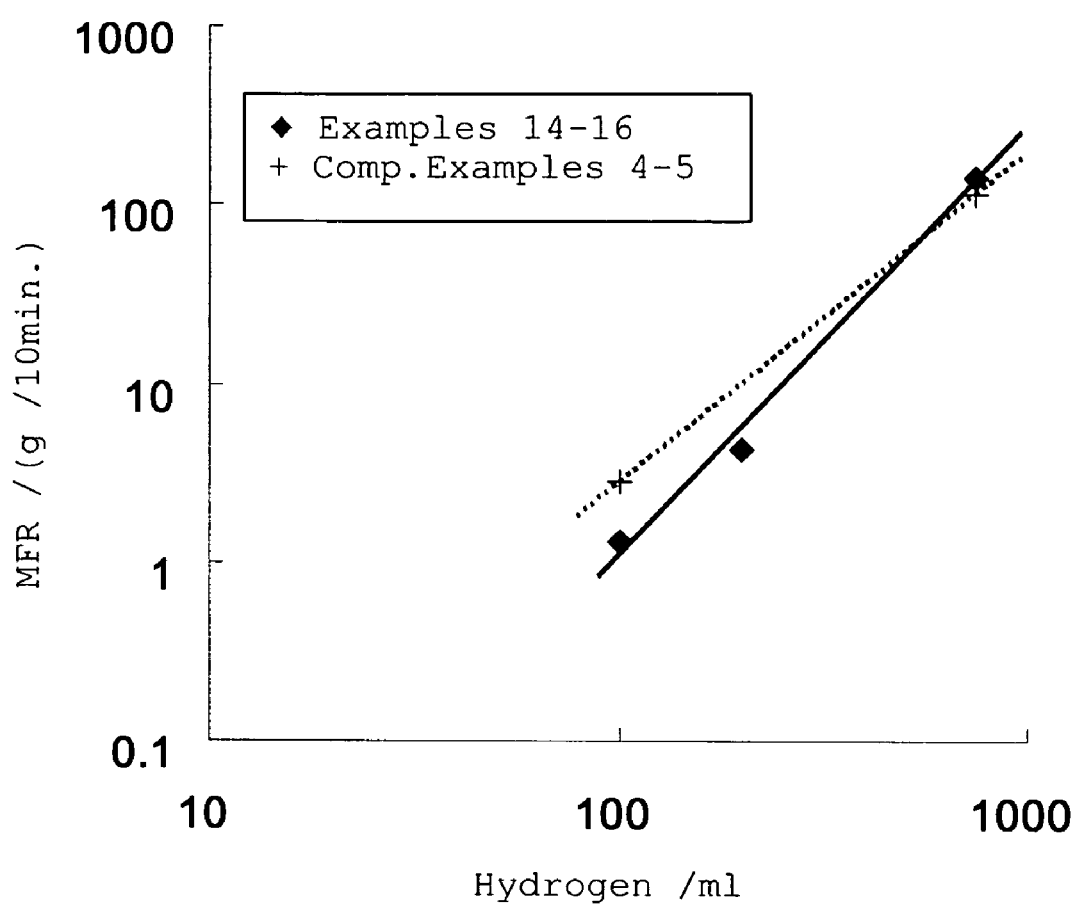
FIG. 1 shows the relationship between the used amount of hydrogen and MFR.

Hereinbelow, the solid titanium catalyst component (I), the catalyst for olefin polymerization and the process for producing an olefin polymer according to the invention will be described in detail.

Solid Titanium Catalyst Component (I)

The solid titanium catalyst component (I) according to the invention is characterized in that it comprises titanium, magnesium, halogen, and a cyclic ester compound (a).

<Cyclic Ester Compound (a)>

The above-described cyclic ester compound (a) comprises a plurality of carboxylic acid ester groups, and is represented by the following formula (1):

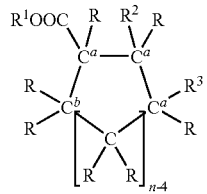

(1)

In the formula (1), n is an integer of 5 to 10, preferably an integer of 5 to 7, and particularly preferably 6. Further, $C^a$ and $C^b$ represent carbon atoms.

$R^2$ and $R^3$ are each independently $COOR^1$ or R, and at least one of $R^2$ and $R^3$ is $COOR^1$.

It is preferable that the bonds between the carbon atoms in the cyclic backbone are all single bonds, but any of single bonds excluding $C^a$—$C^a$ bonds, and a $C^a$—$C^b$ bond in the case where $R^3$ is R, in the cyclic backbone may be replaced with double bonds.

A plurality of $R^1$'s are each independently a monovalent hydrocarbon group having 1 to 20 carbon atoms, preferably 1 to 10 carbon atoms, more preferably 2 to 8 carbon atoms, even more preferably 4 to 8 carbon atoms, and particularly preferably 4 to 6 carbon atoms. Examples of these hydrocarbon groups include an ethyl group, an n-propyl group, an isopropyl group, an n-butyl group, an isobutyl group, a hexyl group, a heptyl group, an octyl group, a 2-ethylhexyl group, a decyl group, a dodecyl group, a tetradecyl group, a hexadecyl group, an octadecyl group, an eicosyl group, and the like; and among them, preferred are an n-butyl group, an isobutyl group, a hexyl group and an octyl group, and more preferred are an n-butyl group and an isobutyl group.

A plurality of R's are each independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, but at least one of R's is not a hydrogen atom.

As the R which is not a hydrogen atom, a hydrocarbon group having 1 to 20 carbon atoms is preferred, and examples of this hydrocarbon group having 1 to 20 carbon atoms include aliphatic, alicyclic or aromatic hydrocarbons such as a methyl group, an ethyl group, an n-propyl group, an isopropyl group, an n-butyl group, an isobutyl group, a sec-butyl group, an n-pentyl group, a cyclopentyl group, an n-hexyl group, a cyclohexyl group, a vinyl group, a phenyl group and an octyl group. Among them, preferred is an aliphatic hydrocarbon group, and specifically preferred are a methyl group, an ethyl group, an n-propyl group, an isopropyl group, an n-butyl group, an isobutyl group and a sec-butyl group.

Further, R's may be bonded to each other to form a ring, and a double bond may be contained in the backbone of the ring formed by the bonding of R's. In the case where two or more $C^a$'s bonded with $COOR^1$ are contained in the backbone of the ring, the backbone of the ring have 5 to 10 carbon atoms.

Examples of the backbone of the ring include a norbornane backbone, a tetracyclododecene backbone, or the like.

Further, a plurality of R's may be a carbonyl structure-containing group such as a carboxylic acid ester group, an alkoxy group, a siloxy group, an aldehyde group and an acetyl group, and it is preferable that these substituents contain one or more hydrocarbon groups.

Examples of the cyclic ester compound (a) include diethyl 3-methylcyclohexane-1,2-dicarboxylate, di-n-propyl 3-methylcyclohexane-1,2-dicarboxylate, diisopropyl 3-methylcyclohexane-1,2-dicarboxylate, di-n-butyl 3-methylcyclohexane-1,2-dicarboxylate, diisobutyl 3-methylcyclohexane-1,2-dicarboxylate, dihexyl 3-methylcyclohexane-1,2-dicarboxylate, diheptyl 3-methylcyclohexane-1,2-dicarboxylate, dioctyl 3-methylcyclohexane-1,2-dicarboxylate, di-2-ethylhexyl 3-methylcyclohexane-1,2-dicarboxylate, didecyl 3-methylcyclohexane-1,2-dicarboxylate, diethyl 4-methylcyclohexane-1,3-dicarboxylate, diisobutyl 4-methylcyclohexane-1,3-dicarboxylate, diethyl 4-methylcyclohexane-1,2-dicarboxylate, di-n-propyl 4-methylcyclohexane-1,2-dicarboxylate, diisopropyl 4-methylcyclohexane-1,2-dicarboxylate, di-n-butyl 4-methylcyclohexane-1,2-dicarboxylate, diisobutyl 4-methylcyclohexane-1,2-dicarboxylate, dihexyl 4-methylcyclohexane-1,2-dicarboxylate, diheptyl 4-methylcyclohexane-1,2-dicarboxylate, dioctyl 4-methylcyclohexane-1,2-dicarboxylate, di-2-ethylhexyl 4-methylcyclohexane-1,2-dicarboxylate, didecyl 4-methylcyclohexane-1,2- dicarboxylate, diethyl 5-methylcyclohexane-1,3-dicarboxylate, diisobutyl 5-methylcyclohexane-1,3-dicarboxylate, diethyl 3,4-dimethylcyclohexane-1,2-dicarboxylate, di-n-propyl 3,4-dimethylcyclohexane-1,2-dicarboxylate, diisopropyl 3,4-dimethylcyclohexane-1,2-dicarboxylate, di-n-butyl 3,4-dimethylcyclohexane-1,2-dicarboxylate, diisobutyl 3,4-dimethylcyclohexane-1,2-dicarboxylate, dihexyl 3,4-dimethylcyclohexane-1,2-dicarboxylate, diheptyl 3,4-dimethylcyclohexane-1,2-dicarboxylate, dioctyl 3,4-dimethylcyclohexane-1,2-dicarboxylate, di-2-ethylhexyl 3,4-dimethylcyclohexane-1,2-dicarboxylate, didecyl 3,4-dimethylcyclohexane-1,2-dicarboxylate, diethyl 3,6-dimethylcyclohexane-1,2-dicarboxylate, di-n-propyl 3,6-dimethylcyclohexane-1,2-dicarboxylate, diisopropyl 3,6-dimethylcyclohexane-1,2-dicarboxylate, di-n-butyl 3,6-dimethylcyclohexane-1,2-dicarboxylate, diisobutyl 3,6-dimethylcyclohexane-1,2-dicarboxylate, dihexyl 3,6-dimethylcyclohexane-1,2-dicarboxylate, diheptyl 3,6-dimethylcyclohexane-1,2-dicarboxylate, dioctyl 3,6-dimethylcyclohexane-1,2-dicarboxylate, di-2-ethylhexyl 3,6-dimethylcyclohexane-1,2-dicarboxylate, didecyl 3,6-dimethylcyclohexane-1,2-dicarboxylate, diethyl 3,6-diphenylcyclohexane-1,2-dicarboxylate, di-n-propyl 3,6-diphenylcyclohexane-1,2-dicarboxylate, diisopropyl 3,6-diphenylcyclohexane-1,2-dicarboxylate, di-n-butyl 3,6-diphenylcyclohexane-1,2-dicarboxylate, diisobutyl 3,6-diphenylcyclohexane-1,2-dicarboxylate, dihexyl 3,6-diphenylcyclohexane-1,2-dicarboxylate, dioctyl 3,6-diphenylcyclohexane-1,2-dicarboxylate, didecyl 3,6-diphenylcyclohexane-1,2-dicarboxylate, diethyl 3-methyl-6-ethylcyclohexane-1,2-dicarboxylate, di-n-propyl 3-methyl-6-ethylcyclohexane-1,2-dicarboxylate, diisopropyl 3-methyl-6-ethylcyclohexane-1,2-dicarboxylate, di-n-butyl 3-methyl-6-ethylcyclohexane-1,2-dicarboxylate, diisobutyl 3-methyl-6-ethylcyclohexane-1,2-dicarboxylate, dihexyl 3-methyl-6-ethylcyclohexane-1,2-dicarboxylate, diheptyl 3-methyl-6-ethylcyclohexane-1,2-dicarboxylate, dioctyl 3-methyl-6-ethylcyclohexane-1,2-dicarboxylate, di-2-ethylhexyl 3-methyl-6-ethylcyclohexane-1,2-dicarboxylate, didecyl 3-methyl-6-ethylcyclohexane-1,2-dicarboxylate, diethyl 3-methyl-6-n-propylcyclohexane-1,2-dicarboxylate, di-n-propyl 3-methyl-6-n-propylcyclohexane-1,2-dicarboxylate, diisopropyl 3-methyl-6-n-propylcyclohexane-1,2-dicarboxylate, di-n-butyl 3-methyl-6-n-propylcyclohexane-1,2-dicarboxylate, diisobutyl 3-methyl-6-n-propylcyclohexane-1,2-dicarboxylate, dihexyl 3-methyl-6-n-propylcyclohexane-1,2-dicarboxylate, diheptyl 3-methyl-6-n-propylcyclohexane-1,2-dicarboxylate, dioctyl 3-methyl-6-n-propylcyclohexane-1,2-dicarboxylate, di-2-ethylhexyl 3-methyl-6-n-propylcyclohexane-1,2-dicarboxylate, didecyl 3-methyl-6-n-propylcyclohexane-1,2-dicarboxylate, diethyl 3-hexylcyclohexane-1,2-dicarboxylate, diisobutyl 3-hexylcyclohexane-1,2-dicarboxylate, diethyl 3,6-dihexylcyclohexane-1,2-dicarboxylate, diisobutyl 3-hexyl-6-pentylcyclohexane-1,2-dicarboxylate, diethyl 3-methylcyclopentane-1,2-dicarboxylate, diisobutyl 3-methylcyclopentane-1,2-dicarboxylate, diheptyl 3-methylcyclopentane-1,2-dicarboxylate, didecyl 3-methylcyclopentane-1,2-dicarboxylate, diethyl 4-methylcyclopentane-1,3-dicarboxylate, diisobutyl 4-methylcyclopentane-1,3-dicarboxylate, diethyl 4-methylcyclopentane-1,2-dicarboxylate, diisobutyl 4-methylcyclopentane-1,2-dicarboxylate, diheptyl 4-methylcyclopentane-1,2-dicarboxylate, didecyl 4-methylcyclopentane-1,2-dicarboxylate, diethyl 5-methylcyclopentane-1,3-dicarboxylate, diisobutyl 5-methylcyclopentane-1,3-dicarboxylate, diethyl 3,4-dimethylcyclopentane-1,2-dicarboxylate, diisobutyl 3,4-dimethylcyclopentane-1,2-dicarboxylate, diheptyl 3,4-dimethylcyclopentane-1,2-dicarboxylate, didecyl 3,4-dimethylcyclopentane-1,2-dicarboxylate, diethyl 3,5-dimethylcyclopentane-1,2-dicarboxylate, diisobutyl 3,5-dimethylcyclopentane-1,2-dicarboxylate, diheptyl 3,5-dimethylcyclopentane-1,2-dicarboxylate, didecyl 3,5-dimethylcyclopentane-1,2-dicarboxylate, diethyl 3-hexylcyclopentane-1,2-dicarboxylate, diethyl 3,5-dihexylcyclopentane-1,2-dicarboxylate, diisobutyl 3-hexyl-5-pentylcyclopentane-1,2-dicarboxylate, diethyl 3-methyl-5-n-propylcyclopentane-1,2-dicarboxylate, di-n-propyl 3-methyl-5-n-propylcyclopentane-1,2-dicarboxylate, diisopropyl 3-methyl-5-n-propylcyclopentane-1,2-dicarboxylate, di-n-butyl 3-methyl-5-n-propylcyclopentane-1,2-dicarboxylate, diisobutyl 3-methyl-5-n-propylcyclopentane-1,2-dicarboxylate, dihexyl 3-methyl-5-n-propylcyclopentane-1,2-dicarboxylate, dioctyl 3-methyl-5-n-propylcyclopentane-1,2-dicarboxylate, didecyl 3-methyl-5-n-propylcyclopentane-1,2-dicarboxylate, diethyl 3-methylcycloheptane-1,2-dicarboxylate, diisobutyl 3-methylcycloheptane-1,2-dicarboxylate, diheptyl 3-methylcycloheptane-1,2-dicarboxylate, didecyl 3-methylcycloheptane-1,2-dicarboxylate, diethyl 4-methylcycloheptane-1,3-dicarboxylate, diisobutyl 4-methylcycloheptane-1,3-dicarboxylate, diethyl 4-methylcycloheptane-1,2-dicarboxylate, diisobutyl 4-methylcycloheptane-1,2-dicarboxylate, diheptyl 4-methylcycloheptane-1,2-dicarboxylate, didecyl 4-methylcycloheptane-1,2-dicarboxylate, diethyl 5-methylcycloheptane-1,3-dicarboxylate, diisobutyl 5-methylcycloheptane-1,3-dicarboxylate, diethyl 3,4-dimethylcycloheptane-1,2-dicarboxylate, diisobutyl 3,4-dimethylcycloheptane-1,2-dicarboxylate, diheptyl 3,4-dimethylcycloheptane-1,2-dicarboxylate, didecyl 3,4-dimethylcycloheptane-1,2-dicarboxylate, diethyl 3,7-dimethylcycloheptane-1,2-dicarboxylate, diisobutyl 3,7-dimethylcycloheptane-1,2-dicarboxylate, diheptyl 3,7-dimethylcycloheptane-1,2-dicarboxylate, didecyl 3,7-dimethylcycloheptane-1,2-dicarboxylate, diethyl 3-hexylcycloheptane-1,2-dicarboxylate, diethyl 3,7-dihexylcycloheptane-1,2-dicarboxylate, diisobutyl 3-hexyl-7-pentylcycloheptane-1,2-dicarboxylate, diethyl 3-methyl-7-n-propylcycloheptane-1,2-dicarboxylate, di-n-propyl 3-methyl-7-n-propylcycloheptane-1,2-dicarboxylate, diisopropyl 3-methyl-7-n-propylcycloheptane-1,2-dicarboxylate, di-n-butyl 3-methyl-7-n-propylcycloheptane-1,2-dicarboxylate, diisobutyl 3-methyl-7-n-propylcycloheptane-1,2-dicarboxylate, dihexyl 3-methyl-7-n-propylcycloheptane-1,2-dicarboxylate, dioctyl 3-methyl-7-n-propylcycloheptane-1,2-dicarboxylate, didecyl 3-methyl-7-n-propylcycloheptane-1,2-dicarboxylate, diethyl 3-methylcyclooctane-1,2-dicarboxylate, diethyl 3-methylcyclodecane-1,2-dicarboxylate, isobutyl 3-vinylcyclohexane-1,2-dicarboxylate, isobutyl 3,6-diphenylcyclohexane-1,2- dicarboxylate, ethyl 3,6-dicyclohexylcyclohexane-1,2-dicarboxylate, diisobutyl norbornane-2,3-dicarboxylate, diisobutyl tetracyclododecane-2,3-dicarboxylate, diethyl 3-methyl-4-cyclohexene-1,2-dicarboxylate, di-n-propyl 3-methyl-4-cyclohexene-1,2-dicarboxylate, diisopropyl 3-methyl-4-cyclohexene-1,2-dicarboxylate, di-n-butyl 3-methyl-4-cyclohexene-1,2-dicarboxylate, diisobutyl 3-methyl-4-cyclohexene-1,2-dicarboxylate, dihexyl 3-methyl-4-cyclohexane-1,2-dicarboxylate, diheptyl 3-methyl-4-cyclohexene-1,2-dicarboxylate, dioctyl 3-methyl-4-cyclohexene-1,2-dicarboxylate, di-2-ethylhexyl 3-methyl-4-cyclohexene-1,2-dicarboxylate, didecyl 3-methyl-4-cyclohexene-1,2-dicarboxylate, diethyl 4-methyl-4-cyclohexene-1,3-dicarboxylate, diisobutyl 4-methyl-4-cyclohexene-1,3-dicarboxylate, diethyl 4-methyl-4-cyclohexene-1,2-dicarboxylate, di-n-propyl 4-methyl-4-cyclohexene-1,2-dicarboxylate, diisopropyl 4-methyl-4-cyclohexene-1,2-dicarboxylate, di-n-butyl 4-methyl-4-cyclohexene-1,2-dicarboxylate, diisobutyl 4-methyl-4-cyclohexene-1,2-dicarboxylate, dihexyl 4-methyl-4-cyclohexene-1,2-dicarboxylate, diheptyl 4-methyl-4-cyclohexene-1,2-dicarboxylate, dioctyl 4-methyl-4-cyclohexene-1,2-dicarboxylate, di-2-ethylhexyl 4-methyl-4-cyclohexene-1,2-dicarboxylate, didecyl 4-methyl-4-cyclohexene-1,2-dicarboxylate, diethyl 5-methyl-4-cyclohexene-1,3-dicarboxylate, diisobutyl 5-methyl-4-cyclohexene-1,3-dicarboxylate, diethyl 3,4-dimethyl-4-cyclohexene-1,2-dicarboxylate, di-n-propyl 3,4-dimethyl-4-cyclohexene-1,2-dicarboxylate, diisopropyl 3,4-dimethyl-4-cyclohexene-1,2-dicarboxylate, di-n-butyl 3,4-dimethyl-4-cyclohexene-1,2-dicarboxylate, diisobutyl 3,4-dimethyl-4-cyclohexene-1,2-dicarboxylate, dihexyl 3,4-dimethyl-4-cyclohexene-1,2-dicarboxylate, diheptyl 3,4-dimethyl-4-cyclohexene-1,2-dicarboxylate, dioctyl 3,4-dimethyl-4-cyclohexene-1,2-dicarboxylate, di-2-ethylhexyl 3,4-dimethyl-4-cyclohexene-1,2-dicarboxylate, didecyl 3,4-dimethyl-4-cyclohexene-1,2-dicarboxylate, diethyl 3,6-dimethyl-4-cyclohexene-1,2-dicarboxylate, di-n-propyl 3,6-dimethyl-4-cyclohexene-1,2-dicarboxylate, diisopropyl 3,6-dimethyl-4-cyclohexene-1,2-dicarboxylate, di-n-butyl 3,6-dimethyl-4-cyclohexene-1,2-dicarboxylate, diisobutyl 3,6-dimethyl-4-cyclohexene-1,2-dicarboxylate, dihexyl 3,6-dimethyl-4-cyclohexene-1,2-dicarboxylate, diheptyl 3,6-dimethyl-4-cyclohexene-1,2-dicarboxylate, dioctyl 3,6-dimethyl-4-cyclohexene-1,2-dicarboxylate, di-2-ethylhexyl 3,6-dimethyl-4-cyclohexene-1,2-dicarboxylate, didecyl 3,6-dimethyl-4-cyclohexene-1,2-dicarboxylate, diethyl 3-hexyl-4-cyclohexene-1,2-dicarboxylate, diisobutyl 3-hexyl-4-cyclohexene-1,2-dicarboxylate, diethyl 3,6-dihexyl-4-cyclohexene-1,2-dicarboxylate, diisobutyl 3-hexyl-6-pentyl-4-cyclohexene-1,2-dicarboxylate, diethyl 3-methyl-3-cyclopentene-1,2-dicarboxylate, diisobutyl 3-methyl-3-cyclopentene-1,2-dicarboxylate, diheptyl 3-methyl-3-cyclopentene-1,2-dicarboxylate, didecyl 3-methyl-3-cyclopentene-1,2-dicarboxylate, diethyl 4-methyl-3-cyclopentene-1,3-dicarboxylate, diisobutyl 4-methyl-3-cyclopentene-1,3-dicarboxylate, diethyl 4-methyl-3-cyclopentene-1,2-dicarboxylate, diisobutyl 4-methyl-3-cyclopentene-1,2-dicarboxylate, diheptyl 4-methyl-3-cyclopentene-1,2-dicarboxylate, didecyl 4-methyl-3-cyclopentene-1,2-dicarboxylate, diethyl 5-methyl-3-cyclopentene-1,3-dicarboxylate, diisobutyl 5-methyl-3-cyclopentene-1,3-dicarboxylate, diethyl 3,4-dimethyl-3-cyclopentene-1,2-dicarboxylate, diisobutyl 3,4-dimethyl-3-cyclopentene-1,2-dicarboxylate, diheptyl 3,4-dimethyl-3-cyclopentene-1,2-dicarboxylate, didecyl 3,4-dimethyl-3-cyclopentene-1,2-dicarboxylate, diethyl 3,5-dimethyl-3-cyclopentene-1,2-dicarboxylate, diisobutyl 3,5-dimethyl-3-cyclopentene-1,2-dicarboxylate, diheptyl 3,5-dimethyl-3-cyclopentene-1,2-dicarboxylate, didecyl 3,5-dimethyl-3-cyclopentene-1,2-dicarboxylate, diethyl 3-hexyl-3-cyclopentene-1,2-dicarboxylate, diethyl 3,5-dihexyl-3-cyclopentene-1,2-dicarboxylate, diisobutyl 3-hexyl-5-pentyl-3-cyclopentene-1,2-dicarboxylate, diethyl 3-methyl-4-cycloheptene-1,2-dicarboxylate, diisobutyl 3-methyl-4-cycloheptene-1,2-dicarboxylate, diheptyl 3-methyl-4-cycloheptene-1,2-dicarboxylate, didecyl 3-methyl-4-cycloheptene-1,2-dicarboxylate, diethyl 4-methyl-4-cycloheptene-1,3-dicarboxylate, diisobutyl 4-methyl-4-cycloheptene-1,3-dicarboxylate, diethyl 4-methyl-4-cycloheptene-1,2-dicarboxylate, diisobutyl 4-methyl-4-cycloheptene-1,2-dicarboxylate, diheptyl 4-methyl-4-cycloheptene-1,2-dicarboxylate, didecyl 4-methyl-4-cycloheptene-1,2-dicarboxylate, diethyl 5-methyl-4-cycloheptene-1,2-dicarboxylate, diisobutyl 5-methyl-4-cycloheptene-1,3-dicarboxylate, diethyl 3,4-dimethyl-4-cycloheptene-1,3-dicarboxylate, diisobutyl 3,4-dimethyl-4-cycloheptene-1,2-dicarboxylate, diheptyl 3,4-dimethyl-4-cycloheptene-1,2-dicarboxylate, didecyl 3,4-dimethyl-4-cycloheptene-1,2-dicarboxylate, diethyl 3,7-dimethyl-4-cycloheptene-1,2-dicarboxylate, diisobutyl 3,7-dimethyl-4-cycloheptene-1,2-dicarboxylate, diheptyl 3,7-dimethyl-4-cycloheptene-1,2-dicarboxylate, didecyl 3,7-dimethyl-4-cycloheptene-1,2-dicarboxylate, diethyl 3-hexyl-4-cycloheptene-1,2-dicarboxylate, diethyl 3,7-dihexyl-4-cycloheptene-1,2-dicarboxylate, diisobutyl 3-hexyl-7-pentyl-4-cycloheptene-1,2-dicarboxylate, diethyl 3-methyl-5-cyclooctene-1,2-dicarboxylate, diethyl 3-methyl-6-cyclodecene-1,2-dicarboxylate, diisobutyl 3-vinyl-4-cyclohexene-1,2-dicarboxylate, diisobutyl 3,6-diphenyl-4-cyclohexene-1,2-dicarboxylate, diethyl 3,6-dicyclohexyl-4-cyclohexene-1,2-dicarboxylate, diisobutyl 2-norbornene-5,6-dicarboxylate, diisobutyl 2-tetracyclododecene-7,8-dicarboxylate, and the like.

The compounds having the diester structure as described above may exist in the form of a cis- or trans-isomer derived from a plurality of the COOR$^1$ groups in the formula (1), either of which has effects complying with the purpose of the invention, but the compounds having higher content of the trans-isomers are preferred. The compounds having higher content of the trans-isomers have the effects of broadening the molecular weight distribution, as well as tend to have higher activity, and higher stereoregularity of the obtained polymer.

As the cyclic ester compound (a), the compound represented by the following formula (1a) is preferable:

A solid titanium catalyst component (I), comprising titanium, magnesium, halogen, and a cyclic ester compound (a) represented by the following formula (1a):

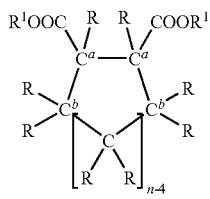

(1a)

wherein n, $R^1$ and R have the same meanings as above (that is, the same as the definitions in the formula (1)), and a single bond (excluding $C^a$—$C^a$ bonds and a $C^a$—$C^b$ bond) in the cyclic backbone may be replaced with a double bond.

As the above-described cyclic ester compound (a), the compounds represented by the following formulas (1-1) to (1-6) are preferable, and the compounds represented by the following formulas (1-1) to (1-3) are more preferable.

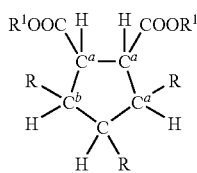

(1-1)

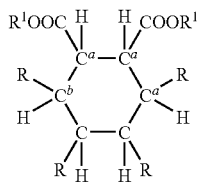

(1-2)

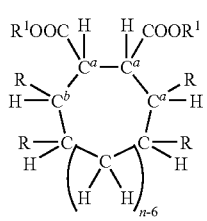

(1-3)

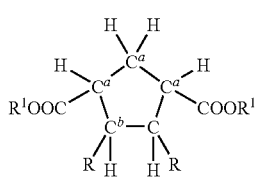

(1-4)

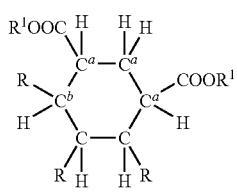

(1-5)

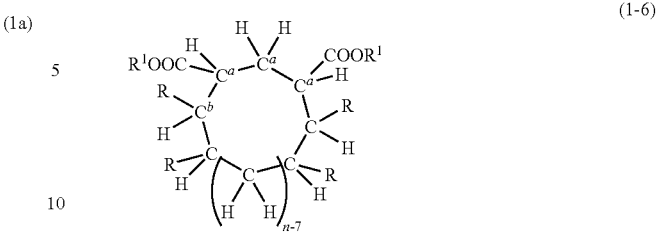

(1-6)

wherein in the formulas (1-1) to (1-6), $R^1$ and R have the same meanings as above;

in the formulas (1-1) to (1-3), a single bond (excluding $C^a$—$C^a$ bonds and a $C^a$—$C^b$ bond) in the cyclic backbone may be replaced with a double bond;

in the formulas (1-4) to (1-6), a single bond (excluding $C^a$—$C^a$ bonds) in the cyclic backbone may be replaced with a double bond; and in the formulas (1-3) and (1-6), n is an integer of 7 to 10.

As the cyclic ester compound (a), particularly preferable are the compounds represented by the following formula (1b):

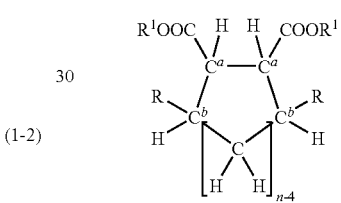

(1b)

wherein n, $R^1$ and R have the same meanings as above (that is, the same as the definitions in the formula (1)), and a single bond (excluding $C^a$—$C^a$ bonds and a $C^a$—$C^b$ bond) in the cyclic backbone may be replaced with a double bond.

Specific examples of the compounds represented by the formula (1b) include diisobutyl 3,6-dimethylcyclohexane-1,2-dicarboxylate, di-n-hexyl 3,6-dimethylcyclohexane-1,2-dicarboxylate, di-n-octyl 3,6-dimethylcyclohexane-1,2-dicarboxylate, diisobutyl 3-methyl-6-ethylcyclohexane-1,2-dicarboxylate, di-n-hexyl 3-methyl-6-ethylcyclohexane-1,2-dicarboxylate, di-n-octyl 3-methyl-6-ethylcyclohexane-1,2-dicarboxylate, diisobutyl 3-methyl-6-n-propylcyclohexane-1,2-dicarboxylate, di-n-hexyl 3-methyl-6-n-propylcyclohexane-1,2-dicarboxylate, di-n-octyl 3-methyl-6-n-propylcyclohexane-1,2-dicarboxylate, diisobutyl 3,6-diethylcyclohexane-1,2-dicarboxylate, di-n-hexyl 3,6-diethylcyclohexane-1,2-dicarboxylate, di-n-octyl 3,6-diethylcyclohexane-1,2-dicarboxylate, diisobutyl 3,5-dimethylcyclopentane-1,2-dicarboxylate, di-n-hexyl 3,5-dimethylcyclopentane-1,2-dicarboxylate, di-n-octyl 3,5-dimethylcyclopentane-1,2-dicarboxylate, diisobutyl 3-methyl-5-ethylcyclopentane-1,2-dicarboxylate, di-n-hexyl 3-methyl-5-ethylcyclopentane-1,2-dicarboxylate, di-n-octyl 3-methyl-5-ethylcyclopentane-1,2-dicarboxylate, di-n-hexyl 3-methyl-5-n-propylcyclopentane-1,2-dicarboxylate, di-n-octyl 3-methyl-5-n-propylcyclopentane-1,2-dicarboxylate, diisobutyl 3,5-diethylcyclopentane-1,2-dicarboxylate, di-n-hexyl 3,5-diethylcyclopentane-1,2-dicarboxylate, di-n-octyl 3,5-diethylcyclopentane-1,2-dicarboxylate, diisobutyl 3,7-dimethylcycloheptane-1,2-dicarboxylate, di-n-hexyl 3,7-dimethylcycloheptane-1,2-dicarboxylate, di-n-octyl 3,7- dimethylcycloheptane-1,2-dicarboxylate, diisobutyl 3-methyl-7-ethylcycloheptane-1,2-dicarboxylate, di-n-hexyl 3-methyl-7-ethylcycloheptane-1,2-dicarboxylate, di-n-octyl 3-methyl-7-ethylcycloheptane-1,2-dicarboxylate, di-n-hexyl 3-methyl-7-n-propylcycloheptane-1,2-dicarboxylate, di-n-octyl 3-methyl-7-n-propylcycloheptane-1,2-dicarboxylate, diisobutyl 3,7-diethylcycloheptane-1,2-dicarboxylate, di-n-hexyl 3,7-diethylcycloheptane-1,2-dicarboxylate, di-n-octyl 3,7-diethylcycloheptane-1,2-dicarboxylate, and the like.

Among these compounds, preferred are diisobutyl 3,6-dimethylcyclohexane-1,2-dicarboxylate, di-n-hexyl 3,6-dimethylcyclohexane-1,2-dicarboxylate, di-n-octyl 3,6-dimethylcyclohexane-1,2-dicarboxylate, diisobutyl 3-methyl-6-ethylcyclohexane-1,2-dicarboxylate, di-n-hexyl 3-methyl-6-ethylcyclohexane-1,2-dicarboxylate, di-n-octyl 3-methyl-6-ethylcyclohexane-1,2-dicarboxylate, diisobutyl 3-methyl-6-n-propylcyclohexane-1,2-dicarboxylate, di-n-hexyl 3-methyl-6-n-propylcyclohexane-1,2-dicarboxylate, di-n-octyl 3-methyl-6-n-propylcyclohexane-1,2-dicarboxylate, diisobutyl 3,6-diethylcyclohexane-1,2-dicarboxylate, di-n-hexyl 3,6-diethylcyclohexane-1,2-dicarboxylate, and di-n-octyl 3,6-diethylcyclohexane-1,2-dicarboxylate.

The reason for this is that these compounds have high catalytic performances, and can be prepared using a Diels Alder reaction at a relatively low cost.

The compounds having the diester structure as described above may exist in the form of a cis-isomer or a trans-isomer, either of which has effects which are consistent with the purpose of the invention.

The purity of the trans-isomers (ratio of trans-isomers in the trans-isomers and cis-isomers) is often preferably more than 50%. The lower limit is preferably 55%, more preferably 60%, and particularly preferably 65%. The upper limit of the purity of the trans-isomers is 100%, and preferably 95%.

These compounds may be used alone or in combination of two or more kinds thereof. Further, these cyclic ester compounds (a) may be used in combination with a catalyst component (b) or a catalyst component (c) as described below, as long as it does not give any adverse effect on the purpose of the invention.

Further, the cyclic ester compound (a) may be formed during the process of producing the solid titanium catalyst component (I). For example, when the solid titanium catalyst component (I) is produced, the cyclic ester compound (a) can be contained in the solid titanium catalyst component (I) by involving a process of substantially bringing an anhydrous carboxylic acid or carboxylic acid dihalide corresponding to the cyclic ester compound (a), and a corresponding alcohol into contact with each other.

By the process for producing an olefin polymer of the invention, a polymer having a broad molecular weight distribution can be obtained. The reason for this is unclear at present, but is assumed to be as follows.

It is known that the cyclic hydrocarbon structures form a variety of steric structures such as a chair conformation and a boat conformation. In addition, when the cyclic structure has a substituent, variation of the steric structure which can be taken further increases. If the bond between a carbon atom bonded with an ester group (COOR¹ group) and another carbon atom bonded with an ester group (COOR¹ group) among the carbon atoms constituting the cyclic backbone of the cyclic ester compound (a) is a single bond, variation of the steric structure which can be taken increases. These various steric structures which can be taken lead to the formation of various active species on the solid titanium catalyst component (I). As a result, when the olefin polymerization is carried out by using the solid titanium catalyst component (I), the olefin polymers having various molecular weights can be prepared at one time, that is, the olefin polymers having broad molecular weight distributions can be prepared.

For the production of the solid titanium catalyst component (I) of the invention, a magnesium compound and a titanium compound are used, in addition to the cyclic ester compound (a).

<Magnesium Compound>

Specific examples of the magnesium compound include well-known magnesium compounds including magnesium halides such as magnesium chloride and magnesium bromide;

alkoxymagnesium halides such as methoxymagnesium chloride, ethoxymagnesium chloride and phenoxymagnesium chloride;

alkoxymagnesium such as ethoxymagnesium, isopropoxymagnesium, butoxymagnesium and 2-ethylhexoxymagnesium;

aryloxymagnesiums such as phenoxymagnesium;

magnesium carboxylates such as magnesium stearate;

and the like.

These magnesium compounds may be used alone or in combination of two or more kinds thereof. Further, these magnesium compounds may be in the form of a complex compound or a composite compound with other metals, or in the form of a mixture with other metal compounds.

Among these, halogen-containing magnesium compounds are preferred, and magnesium halide, in particular magnesium chloride is preferably used. In addition, alkoxymagnesium such as ethoxymagnesium is also preferably used. Further, the magnesium compounds may be those derived from other materials, for example, those obtained by bringing an organomagnesium compound such as a Grignard reagent, and titanium halide, silicon halide, alcohol halide, and the like into contact with each other.

<Titanium Compound>

Examples of the titanium compound include a tetravalent titanium compound represented by the following formula:

$$Ti(OR)_g X_{4-g}$$

(wherein R is a hydrocarbon group, X is a halogen atom, and g satisfies the condition $0 \leq g \leq 4$). More specifically, examples thereof include titanium tetrahalides such as $TiCl_4$ and $TiBr_4$;

alkoxytitanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;

alkoxytitanium dihalides such as $Ti(OCH_3)_2Cl_2$ and $Ti(OC_2H_5)_2Cl_2$;

alkoxytitanium monohalides such as $Ti(OCH_3)_3Cl$, $Ti(O\text{-}n\text{-}C_4H_9)_3Cl$ and $Ti(OC_2H_5)_3Br$;

tetraalkoxytitaniums such as $Ti(OCH_3)_4$, $Ti(OC_2H_5)_4$, $Ti(O\text{-}n\text{-}C_4H_9)_4$ and $Ti(O\text{-}2\text{-}ethylhexyl)_4$;

and the like.

Among these, preferred are titanium tetrahalides, and particularly preferred is titanium tetrachloride. These titanium compounds can be used alone or in combination of two or more kinds thereof.

Examples of the magnesium compounds and the titanium compounds include those as described in detail in the above-described Patent Document 1, Patent Document 2, or the like.

For the production of the solid titanium catalyst component (I) of the invention, a well-known method can be employed without limit except that the cyclic ester compound (a) is used. Specific preferable examples of the process include the following processes (P-1) to (P-4).

(P-1) Process of bringing a solid adduct comprising of a magnesium compound and a catalyst component (b), a cyclic ester compound (a) and a liquid-state titanium compound into contact with each other in a suspended state in the coexistence of an inert hydrocarbon solvent.

(P-2) Process of bringing a solid adduct comprising of a magnesium compound and a catalyst component (b), a cyclic ester compound (a) and a liquid-state titanium compound into contact with each other in plural steps.

(P-3) Process of bringing a solid adduct comprising of a magnesium compound and a catalyst component (b), a cyclic ester compound (a) and a liquid-state titanium compound into contact with each other in a suspended state in the coexistence of an inert hydrocarbon solvent, and in plural steps.

(P-4) Process of bringing a liquid-state magnesium compound comprising of a magnesium compound and a catalyst component (b), a liquid-state titanium compound and a cyclic ester compound (a) into contact with each other.

The reaction temperature for the production of the solid titanium catalyst component (I) is in the range of preferably −30° C. to 150° C., more preferably −25° C. to 130° C., and even more preferably −25° C. to 120° C.

Further, the production of the solid titanium catalyst component can be carried out, if necessary, in the presence of a well-known medium. Examples of the medium include the compounds of aromatic hydrocarbons such as toluene having some polarity, well-known aliphatic hydrocarbons or alicyclic hydrocarbons such as heptane, octane, decane and cyclohexane, and among these, aliphatic hydrocarbons are preferably exemplified.

When the olefin polymerization reaction is carried out by using the solid titanium catalyst component (I) prepared within the above-described range, the effect of obtaining a polymer having a broad molecular weight distribution can be highly compatibilized with activity of the catalyst and high stereoregularity of the obtained polymer.

(Catalyst Component (b))

For the catalyst component (b) used for the formation of the above-described solid adduct or liquid-state magnesium compound, preferred are well-known compounds which can solubilize the magnesium compound in the temperature range of room temperature to around 300° C., and preferred are, for example, alcohols, aldehydes, amines, carboxylic acids and a mixture thereof. Examples of these compounds include those as described in detail in the above-described Patent Document 1 or Patent Document 2.

More specific examples of alcohols having ability to solubilize the magnesium compound include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol;

alicyclic alcohols such as cyclohexanol and methylcyclohexanol;

aromatic alcohols such as benzyl alcohol and methylbenzyl alcohol;

aliphatic alcohols having an alkoxy group such as n-butyl cellosolve;

and the like.

Examples of the carboxylic acids include organic carboxylic acids having at least 7 carbon atoms, such as caprylic acid and 2-ethylhexanoic acid. Examples of the aldehydes include aldehydes having at least 7 carbon atoms, such as capric aldehyde and 2-ethylhexyl aldehyde.

Examples of the amines include amines having at least 6 carbon atoms, such as heptylamine, octylamine, nonylamine, laurylamine and 2-ethylhexylamine.

As the catalyst component (b), preferred are the above-described alcohols, and particularly preferred are ethanol, propanol, butanol, isobutanol, hexanol, 2-ethylhexanol, decanol and the like.

The amounts of the magnesium compound and the catalyst component (b) to be used in the production of the solid adduct or liquid-state magnesium compound vary depending on the kinds thereof, the contact conditions, or the like, but the magnesium compound is used in an amount of 0.1 to 20 mol/liter, and preferably 0.5 to 5 mol/liter per unit volume of the catalyst component (b). Further, if desired, a medium which is inert to the solid adduct can be used in combination. Preferable examples of the medium include well-known hydrocarbon compounds such as heptane, octane and decane.

The compositional ratio of magnesium of the obtained solid adduct or liquid-state magnesium compound to the catalyst component (b) varies depending on the kinds of the compound to be used, and thus it cannot be generally defined. But the amount of the catalyst component (b) is in the range of preferably 2.0 moles or more, more preferably 2.2 moles or more, even more preferably 2.3 moles or more and particularly preferably 2.4 moles or more and 5 moles or less, based on 1 mole of magnesium in the magnesium compound.

<Aromatic Carboxylic Acid Ester and/or Compound having Two or More Ether Linkages Through a Plurality of Carbon Atoms>

The solid titanium catalyst component (I) of the invention may further comprise an aromatic carboxylic acid ester and/or a compound having two or more ether linkages through a plurality of carbon atoms (hereinafter, also referred to as the "catalyst component (c)"). When the solid titanium catalyst component (I) of the invention contains the catalyst component (c), activity and stereoregularity may be increased or the molecular weight distribution may be further broadened.

As this catalyst component (c), well-known aromatic carboxylic acid esters or polyether compounds, which are preferably used for the conventionally used catalysts for olefin polymerization, for example, those as described in the above-described Patent Document 2, JP-A No. 2001-354714, or the like can be used without limit.

Specific examples of this aromatic carboxylic acid ester include aromatic polyvalent carboxylic acid esters such as phthalic acid ester, in addition to aromatic carboxylic acid monoesters such as benzoic acid ester and toluic acid ester. Among these, preferred are aromatic polyvalent carboxylic acid esters, and more preferred are phthalic acid esters. As these phthalic acid esters, preferred are phthalic acid alkyl esters such as ethyl phthalate, n-butyl phthalate, isobutyl phthalate, hexyl phthalate and heptyl phthalate, and particularly preferred is diisobutyl phthalate.

Further, more specific examples of the polyether compounds include the compounds represented by the following formula (3):

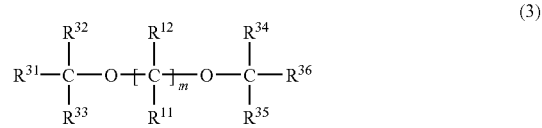

(3)

Further, in the above formula (3), m is an integer satisfying the condition $1 \leq m \leq 10$, and preferably an integer satisfying the condition $3 \leq m \leq 10$, and $R^{11}$ to $R^{36}$ are each independently a hydrogen atom or substituents having at least one kind of element selected from carbon, hydrogen, oxygen, fluorine, chlorine, bromine, iodine, nitrogen, sulfur, phosphorus, boron and silicon.

When m is 2 or more, a plurality of $R^{11}$ and $R^{12}$ may be the same or different from each other. Any of $R^{11}$ to $R^{36}$, and preferably $R^{11}$ and $R^{12}$ may be bonded to each other to form a ring other than a benzene ring.

Specific examples of some of these compounds include monosubstituted dialkoxypropanes such as 2-isopropyl-1,3-dimethoxypropane, 2-s-butyl-1,3-dimethoxypropane, and 2-cumyl-1,3-dimethoxypropane;

disubstituted dialkoxypropanes such as 2-isopropyl-2-isobutyl-1,3-dimethoxypropane, 2,2-dicyclohexyl-1,3-dimethoxypropane, 2-methyl-2-isopropyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-dimethoxypropane, 2-isopropyl-2-isopentyl-1,3-dimethoxypropane and 2-cyclohexyl-2-cyclohexylmethyl-1,3-dimethoxypropane;

dialkoxyalkanes such as 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane and 2,4-diisoamyl-1,5-dimethoxypentane;

trialkoxyalkanes such as 2-methyl-2-methoxymethyl-1,3-dimethoxypropane, 2-cyclohexyl-2-ethoxymethyl-1,3-diethoxypropane and 2-cyclohexyl-2-methoxymethyl-1,3-dimethoxypropane;

dialkoxycycloalkenes such as 2,2-diisobutyl-1,3-dimethoxy-4-cyclohexene, 2-isopropyl-2-isoamyl-1,3-dimethoxy-4-cyclohexene, 2-cyclohexyl-2-methoxymethyl-1,3-dimethoxy-4-cyclohexene, 2-isopropyl-2-methoxymethyl-1,3-dimethoxy-4-cyclohexene, 2-isobutyl-2-methoxymethyl-1,3-dimethoxy-4-cyclohexene, 2-cyclohexyl-2-ethoxymethyl-1,3-dimethoxy-4-cyclohexene, 2-isopropyl-2-ethoxymethyl-1,3-dimethoxy-4-cyclohexene and 2-isobutyl-2-ethoxymethyl-1,3-dimethoxy-4-cyclohexene; and the like.

Among these, preferred are 1,3-diethers, and particularly preferred are 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

These compounds may be used alone or in combination of two or more kinds thereof.

The cyclic ester compound (a), the catalyst component (b) and the catalyst component (c) as described above may well be thought to belong to the components which are referred to as electron donors by a skilled person in the art. It is known that the electron donor components have the effect of enhancing stereoregularity of the obtained polymer, the effect of controlling the composition distribution of the obtained copolymer and the effect as an aggregator of controlling the particle shape and particle size of the catalyst particle, while maintaining high activity of the catalyst.

It is thought that the cyclic ester compound (a) also exhibits the effect of controlling the molecular weight distribution because it itself is an electron donor.

For the solid titanium catalyst (I) of the invention, the halogen/titanium (atomic ratio) (i.e., number of moles of the halogen atoms/number of moles of the titanium atoms) is preferably 2 to 100, and more preferably 4 to 90;

the cyclic ester compound (a)/titanium (molar ratio) (i.e., number of moles of the cyclic ester compound (a))/number of moles of the titanium atoms) is preferably 0.01 to 100, and more preferably 0.2 to 10; and as for the catalyst component (b) and the catalyst component (c), the catalyst component (b)/the titanium atom (molar ratio) is preferably 0 to 100, and more preferably 0 to 10, and the catalyst component (c)/the titanium atom (molar ratio) is preferably 0 to 100, and more preferably 0 to 10.

The magnesium/titanium (atomic ratio) (i.e., number of moles of the magnesium atoms/number of moles of the titanium atoms) is preferably 2 to 100, and more preferably 4 to 50.

The contents of the components which may be contained in addition to the cyclic ester compound (a), for example, the catalyst component (b) and the catalyst component (c) are 20% by weight or less, and preferably 10% by weight or less, based on 100% by weight of the cyclic ester compound (a).

As the more specific production conditions of the solid titanium catalyst component (I), the conditions as described in, for example, EP 585869 A1 (European patent application publication No. 0585869), the above-described Patent Document 2, or the like can be preferably employed, except that the cyclic ester compound (a) is used.

Catalyst for Olefin Polymerization

The catalyst for olefin polymerization according to the invention is characterized in that it comprises the solid titanium catalyst component (I) according to the invention and an organometallic compound catalyst component (II) containing a metal element selected from Groups I, II and XIII of the periodic table.

<Organometallic Compound Catalyst Component (II)>

For the organometallic compound catalyst component (II), a compound containing a metal in Group XIII, for example, an organoaluminum compound and a complex alkylate of a metal in Group I and aluminum, an organometallic compound of a metal in Group II, or the like can be used. Among these, preferred is the organoaluminum compound.

Specific preferable examples of the organometallic compound catalyst component (II) include the organometallic compound catalyst components as described in well-known documents, for example, the above-described EP 585869 A1.

<Catalyst Component (III)>

The catalyst for olefin polymerization of the invention, if necessary, may comprise the above-described catalyst component (III) together with the organometallic compound catalyst component (II). Preferable examples of the catalyst component (III) include organosilicon compounds. Examples of these organosilicon compounds include the compound represented by the following general formula (4):

$$R_nSi(OR')_{4-n} \qquad (4)$$

wherein R and R' are hydrocarbon groups, and n is an integer satisfying the condition 0<n<4.

As the organosilicon compounds represented by the above formula (4), specifically diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, cyclopentyldimethylethoxysilane, or the like is used.

Among these, vinyltriethoxysilane, diphenyldimethoxysilane, dicyclohexyldimethoxysilane, cyclohexylmethyldimethoxysilane or dicyclopentyldimethoxysilane is preferably used.

Also, preferable examples of the above-described organosilicon compounds further include the silane compounds represented by the following formula (5) as described in the pamphlet of International Publication WO 2004/016662.

$$Si(OR^a)_3(NR^bR^c) \quad (5)$$

In the formula (5), $R^a$ is a hydrocarbon group having 1 to 6 carbon atoms, and examples of $R^a$ include an unsaturated or saturated aliphatic hydrocarbon group having 1 to 6 carbon atoms, or the like, and particularly preferably a hydrocarbon group having 2 to 6 carbon atoms. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, and the like, among which an ethyl group is particularly preferable.

In the formula (5), $R^b$ is a hydrocarbon group having 1 to 12 carbon atoms or a hydrogen atom, and examples of $R^b$ include an unsaturated or saturated aliphatic hydrocarbon group having 1 to 12 carbon atoms, a hydrogen atom, and the like. Specific examples thereof include a hydrogen atom, a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

In the formula (5), $R^c$ is a hydrocarbon group having 1 to 12 carbon atoms, and examples of $R^c$ include an unsaturated or saturated aliphatic hydrocarbon group having 1 to 12 carbon atoms, a hydrogen atom, and the like. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

Specific examples of the compound represented by the formula (5) include dimethylaminotriethoxysilane, diethylaminotriethoxysilane, diethylaminotrimethoxysilane, diethylaminotriethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethylisopropylaminotriethoxysilane and methylethylaminotriethoxysilane.

Further, other examples of the above-described organosilicon compounds include the compound represented by the following formula (6):

$$RNSi(OR^a)_3 \quad (6)$$

In the formula (6), RN is a cyclic amino group, and examples of the cyclic amino group include a perhydroquinolino group, a perhydroisoquinolino group, a 1,2,3,4-tetrahydroquinolino group, a 1,2,3,4-tetrahydroisoquinolino group, an octamethyleneimino group, and the like. Specific examples of the compound represented by the above formula (6) include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, octamethyleneiminotriethoxysilane, and the like.

These organosilicon compounds may be used in combination of two or more kinds thereof.

Further, other preferable examples of the compounds which are useful as the catalyst component (III) include polyether compounds which are exemplified as the aromatic carboxylic acid ester and/or the compound having two or more ether linkages through a plurality of carbon atoms (the catalyst component (c)).

Among these polyether compounds, preferred are 1,3-diethers, and particularly preferred is 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

These compounds may be used alone or in combination of two or more kinds thereof.

Further, the catalyst for olefin polymerization of the invention may further comprise other components useful for olefin polymerization, if necessary, in addition to each of the above-described components. Examples of such other components include a support such as silica, an antistatic agent, a particle coagulant, a preservation stabilizing agent, and the like.

Process for Producing Olefin Polymer

The process for producing an olefin polymer according to the invention is characterized in that it comprises polymerizing an olefin by using the catalyst for olefin polymerization of the invention. In the invention, the term "polymerization" may encompass copolymerization such as random copolymerization and block copolymerization, as well as homopolymerization.

For the process for producing an olefin polymer of the invention, it is also possible that polymerization is carried out in the presence of a prepolymerization catalyst obtained by prepolymerization of an α-olefin in the presence of the catalyst for olefin polymerization of the invention. This prepolymerization is carried out by prepolymerization of an α-olefin in an amount of 0.1 to 1000 g, preferably 0.3 to 500 g, and particularly preferably 1 to 200 g, based on 1 g of the catalyst for olefin polymerization.

The concentration of the catalyst in the prepolymerization system may be higher than that in the polymerization system.

In the prepolymerization, the concentration of the solid titanium catalyst component (I) is in the range of preferably about 0.001 to 200 mmol, more preferably about 0.01 to 50 mmol, and particularly preferably 0.1 to 20 mmol, in terms of titanium atom, based on 1 liter of the liquid medium.

In the prepolymerization, the amount of the organometallic compound catalyst component (II) may be such that 0.1 to 1,000 g, and preferably 0.3 to 500 g of the polymer is produced, based on 1 g of the solid titanium catalyst component (I), and the amount is preferably about 0.1 to 300 mol, more preferably about 0.5 to 100 mol, and particularly preferably 1 to 50 mol, based on 1 mol of the titanium atom in the solid titanium catalyst component (I).

In the prepolymerization, the catalyst component (III) may be used, if necessary, and these components are used in an amount of 0.1 to 50 mol, preferably 0.5 to 30 mol, and particularly preferably 1 to 10 mol, based on 1 mol of the titanium atom in the solid titanium catalyst component (I).

The prepolymerization can be carried out under the mild condition by adding an olefin and the above-described catalyst components to an inert hydrocarbon medium.

In this case, specific examples of the inert hydrocarbon medium to be used include aliphatic hydrocarbons such as propane, butane, pentane, hexane, heptane, octane, decane, dodecane and kerosene;

alicyclic hydrocarbons such as cycloheptane, methylcycloheptane, 4-cycloheptane and methyl-4-cycloheptane;

aromatic hydrocarbons such as benzene, toluene and xylene;

halogenated hydrocarbons such as ethylene chloride and chlorobenzene;

and a mixture thereof.

Among these inert hydrocarbon media, aliphatic hydrocarbons are particularly preferably used. As such, when the inert hydrocarbon medium is used, it is preferable that the prepolymerization is carried out batchwise.

On the other hand, the prepolymerization may be carried out by using olefin itself as a solvent, and substantially without a solvent. In this case, it is preferable that the prepolymerization is carried out continuously.

The olefins used in the prepolymerization may be the same or different from those used in the polymerization as described below, and specifically, it is preferably propylene.

The temperature for prepolymerization is in the range of preferably about −20 to +100° C., more preferably about −20 to +80° C., and even more preferably 0 to +40° C.

Next, the polymerization after the afore-mentioned prepolymerization or without prepolymerization will be described.

Examples of the olefins which can be used (that is, polymerized) for the polymerization include α-olefins having 3 to 20 carbon atoms, for example, linear olefins such as propylene, 1-butene, 1-pentene, 1-hexene, 1-octene, 1-decene, 1-dodecene, 1-tetradecene, 1-hexadecene, 1-octadecene and 1-eicosene; and branched olefins such as 4-methyl-1-pentene, 3-methyl-1-pentene and 3-methyl-1-butene, and preferred are propylene, 1-butene, 1-pentene and 4-methyl-1-pentene. Further, particularly preferred are propylene, 1-butene and 4-methyl-1-pentene, from the viewpoint that the polymer having a broader molecular weight distribution easily exhibits its advantages for the resin with high rigidity.

Along with these α-olefins, ethylene; aromatic vinyl compounds such as styrene and allylbenzene; or alicyclic vinyl compounds such as vinylcyclohexane and vinylcycloheptane can be used. Furthermore, the compound having a polyunsaturated bond such as, for example, conjugated dienes or nonconjugated dienes, for example, dienes such as cyclopentene, cycloheptene, norbornene, tetracyclododecene, isoprene and butadiene can be used as the polymerization materials together with ethylene and an α-olefin. These compounds may be used alone or in combination of two or more kinds thereof. (Hereinafter, ethylene or the olefins to be used together with the "α-olefin having 3 to 20 carbon atoms" may be also referred to as "other olefins").

Among such other olefins, preferred are ethylene and the aromatic vinyl compounds. Further, small amount, for example, 10% by weight or less, and preferably 5% by weight, based on 100% by weight of the total amount of olefins, of the other olefins such as ethylene may be used in combination therewith.

According to the invention, the prepolymerization and the polymerization can be carried out in any of liquid phase polymerizations such as bulk polymerization, solution polymerization and suspension polymerization, and vapor phase polymerization.

When slurry polymerization is employed for the polymerization, the inert hydrocarbons used in the prepolymerization as described above, or an olefin which is liquid at a reaction temperature can be used as a reaction solvent.

In the polymerization in the process for producing the polymer of the invention, the above-described solid titanium catalyst component (I) is used in an amount of usually about 0.0001 to 0.5 mmol, and preferably about 0.005 to 0.1 mmol, in terms of titanium atom, based on 1 liter of the polymerization volume. Further, the above-described organometallic compound catalyst component (II) is used in an amount of usually about 1 to 2000 mol, preferably about 5 to 500 mol, more preferably 10 to 350 mol, even more preferably 30 to 350 mol, and particularly preferably 50 to 350 mol, in terms of titanium atom in the prepolymerization catalyst component in the polymerization system. The above-described catalyst component (III), if used, is used in an amount of 0.001 to 50 mol, preferably 0.01 to 30 mol, and particularly preferably 0.05 to 20 mol in the organometallic compound catalyst component (II).

If the polymerization is carried out in the presence of hydrogen, the molecular weight of the obtained polymer can be controlled to obtain a polymer with a high melt flow rate.

In the polymerization according to the invention, the polymerization temperature of olefins is in the range of usually about 20 to 200° C., preferably about 30 to 100° C., and more preferably about 50 to 90° C. The pressure is set to be in the range of usually ambient pressure to 100 kgf/cm$^2$ (9.8 MPa), and preferably about 2 to 50 kgf/cm$^2$ (0.20 to 4.9 MPa). In the process for producing a polymer of the invention, the polymerization can be carried out by any of batchwise, semi-continuous and continuous processes. Further, the polymerization can be carried out in two or more stages under different reaction conditions. When the multi-stage polymerization is carried out, it is possible to further broaden the molecular weight distribution of the olefin polymer.

Thus obtained olefin polymer may be any one of a homopolymer, a random copolymer, a block copolymer, and the like.

If the polymerization of an olefin, in particular the polymerization of propylene is carried out by using the catalyst for olefin polymerization, a propylene polymer with high stereoregularity which has a content of the decane-insoluble components of 70% or more, preferably 85% or more, and particularly preferably 90% or more is obtained.

Further, according to the process for producing an olefin polymer of the invention, even when the polymerization is carried out in a small number of stages, for example, one stage, rather than in multi-stages, a polyolefin, in particular polypropylene, having a broad molecular weight distribution can be obtained. The process for producing an olefin polymer of the invention is characterized in that an olefin polymer may be often obtained, which has a higher ratio of the high molecular weight components and a lower ratio of the low molecular weight components (particularly referred to as "Beta" components (sticky components)), as compared with the conventional olefin polymers having the same melt flow rate (MFR) as the present olefin polymer. These characteristics can be confirmed by gel permeation chromatography (GPC) measurement described below, and a polymer having both of a high Mw/Mn value and a high Mz/Mw value can be obtained.

The conventional polypropylene obtained by using a solid titanium catalyst component comprising magnesium, titanium, halogen and an electron donor generally has an Mw/Mn value of 5 or less and an Mz/Mw value of less than 4, which are indicators of the molecular weight distribution as determined by GPC measurement, for example, in the region with an MFR of 1 to 10 g/10 min. However, according to the process for producing an olefin polymer of the invention, an olefin polymer having an Mw/Mn value of 6 to 30, and preferably 7 to 20 can be obtained under the same polymerization conditions as described above. Further, an olefin polymer having an Mz/Mw value of preferably 4 to 15, and more preferably 4.5 to 10 can be obtained. Particularly, according to the process for producing an olefin polymer of the invention, a polymer having a high Mz/Mw value can be often obtained.

It is commonly known to a skilled person in the art that polypropylene having a high Mw/Mn value is excellent in moldability and rigidity. On the other hand, a high Mz/Mw value indicates a high content of high molecular weight components, and thus it is expected that the obtained propylene has high melt tension and excellent moldability.

When the process for producing an olefin polymer of the invention is used, a polymer having a broad molecular weight distribution can be obtained even without the use of multi-stage polymerization, and thus it is possible to make the apparatus for producing a polymer simpler. Further, when the conventional multi-stage polymerization is applied, it is expected that a polymer with more excellent melt tension and moldability can be obtained.

It is commonly known to a skilled person in the art that polypropylene having a high Mw/Mn value is excellent in moldability and rigidity. On the other hand, a high Mz/Mw value indicates a high content of high molecular weight components, and thus it is expected that the obtained propylene has high melt tension and excellent moldability.

Accordingly, it is expected that the olefin polymer obtained by the polymerization process for olefin according to the invention provides an injection molded product having high rigidity and an injection molded product having high strength in the weld part. It is also expected that the stability of bubbles is high in the inflation molding, thereby attaining a film having wide width. It is also expected that a film having wide width can be obtained even with molding films or separators by the use of T-Die. It is further expected that a large molded product is easily obtained in blow molding, vacuum molding, contour extraction molding, and stamping molding.

When the olefin polymerization process of the invention is used, a polymer having a broad molecular weight distribution can be obtained even without carrying out a multi-stage polymerization, and thus it is possible to make the apparatus for producing a polymer simpler. Further, when the conventional multi-stage polymerization is applied, it is expected that a polymer with more excellent melt tension and moldability can be obtained.

As other methods for obtaining a polymer having a broad molecular weight distribution, the methods of dissolving and mixing, or dissolving and kneading the polymers having different molecular weights can be employed, but the polymers obtained by these methods may have insufficient in improvement on melt tension or moldability, while involving relatively complicated operations. The reason for this is presumed that the polymers having different molecular weights are basically difficult to be mixed with each other. On the other hand, since the polymers obtained by means of the process for producing an olefin polymer of the invention are mixture of the polymers having extremely broad, different molecular weights in a catalytic level, that is, a nano-level, it is expected that they have high melt tension and excellent moldability.

EXAMPLES

Hereinbelow, the present invention will be described with reference to Examples, but it should be not construed that the invention is limited to these Examples.

In the following Examples, the bulk specific gravity, the melt flow rate, the content of the decane-soluble (insoluble) components, the molecular weight distribution, or the like of the propylene polymer were measured by the methods described below.

(1) Bulk Specific Gravity:

The bulk specific gravity was measured in accordance with JIS K-6721.

(2) Melt Flow Rate (MFR):

The melt flow rate (MFR) was measured in accordance with ASTM D 1238E at a measurement temperature of 230° C. in the case of a propylene polymer, and 260° C. in the case of a 4-methyl-1-pentene polymer.

(3) Content of Decane-soluble (Insoluble) Components:

Into the glass container for measurement were introduced about 3 g (measurement was made in the order of $10^{-4}$ g, and the weight was represented by b (g) in the following equation) of a propylene polymer, 500 ml of decane, and a small amount of a heat-resistant stabilizer soluble in decane, and the mixture was stirred with a stirrer while elevating the temperature to 150° C. over 2 hours under a nitrogen atmosphere to dissolve the propylene polymer, maintained at 150° C. for 2 hours, and then slowly cooled to 23° C. over 8 hours. The solution containing the obtained precipitates of the propylene polymer was filtered under reduced pressure with a glass filter of a 25G-4 specification manufactured by Iwata glass Co., Ltd. 100 ml of the filtrate was taken and dried under reduced pressure to obtain a portion of the decane-soluble components, the weight of which was measured in the order of $10^{-4}$ g (this weight was represented by a (g) in the following equation). After this operation, the amount of the decane-soluble components was determined by the following equation:

Content of decane-soluble components=$100 \times (500 \times a)/(100 \times b)$

Content of decane-insoluble components=$100-100 \times (500 \times a)/(100 \times b)$ (4) Molecular Weight Distribution:

The Mw/Mn value and the Mz/Mw value were calculated by analyzing, using a well-known method, the chromatogram obtained by the measurement under the following conditions. The measurement time per one sample was 60 minutes.

Liquid chromatograph: ALC/GPC 150-C plus type manufactured by Waters Co., Ltd. (Integrated type differential refractometer-detector)

Column: GMH6-HT×2 and GMH6-HTL×2 manufactured by Tosoh Corporation connected in series Mobile phase medium: o-dichlorobenzene Flow rate: 1.0 ml/min Measurement temperature: 140° C.

Process for producing calibration curve: Using standard polystyrene sample

Concentration of sample: 0.10% (w/w)

Amount of sample solution: 500 μl (5) Melt Tension:

Using an apparatus for measurement of melt tension provided with an equipment for measurement of melt tension in a Capirograph "1B" type apparatus manufactured by Toyo Seiki Seisaku-sho, Ltd., the strand of the sample resin, melted for 6 minutes in the cylinder at 230° C. (under a nitrogen atmosphere) in the apparatus, was extruded through a nozzle having a length of 8 mm and a diameter of 2.095 mm with a piston. The extrusion speed of the piston was 15 mm/min. This strand was pulled out in the shape of a filament, and wound up using a roller at a predetermined speed through a pulley provided with the load cell. At this time, the stress force as defected with the load cell was referred to a melt tension.

In addition, as the compound corresponding to the above-described cyclic ester compound (a), a product synthesized by AZUMA-Japan, Inc. was used unless specifically mentioned otherwise. The purities of the isomers of trans- and cis-conformation are both 95% or more unless specifically mentioned otherwise.

Example 1

(Production of Solid Titanium Catalyst Component (α1))

A high speed stirring device having an internal volume of 2 liters (manufactured by Tokushu Kika Kogyo Co., Ltd.) was sufficiently purged with nitrogen, and 700 ml of purified decane, 10 g of commercial available magnesium chloride, 24.2 g of ethanol and 3 g of Leodol (trade name) SP-S20 (sorbitan distearate, manufactured by Kao Corporation) were charged thereinto. While stirring this suspension, the temperature of the system was elevated and the suspension was stirred at 120° C. and 800 rpm for 30 minutes. Then, this suspension was transferred to a 2-liter glass flask (equipped with a stirrer) which was previously charged with 1 liter of purified decane cooled to −10° C. by using a Teflon (registered trade mark) tube having an inner diameter of 5 mm under high speed stirring so as not to generate the precipitates. The solid obtained from liquid transferring was filtered and sufficiently washed with purified n-hexane to obtain a solid adduct in which 2.8 mol of ethanol is coordinated to 1 mol of magnesium chloride.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixture was elevated to 80° C. over 5 hours. When the temperature reached 80° C., diisobutyl 4-methyl-cyclohexane-1, 2-dicarboxylate (a mixture of a cis-isomer and a trans-isomer) was added thereto in a proportion of 0.15 mol, based on 1 mol of a magnesium atom in the solid adduct, and then the temperature thereof was elevated to 120° C. over 40 minutes. The temperature was maintained at 120° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α1) which was prepared in the above procedure was stored as a decane slurry. An aliquot portion of the slurry was picked and dried to examine the catalyst composition.

(Polymerization)

To a polymerization vessel with an internal volume of 2 liters, 500 g of propylene and 1 NL of hydrogen were added at room temperature, and then 0.5 mmol of triethylaluminum, 0.1 mmol of cyclohexylmethyldimethoxysilane and 0.004 mmol, in terms of titanium atom, of the solid catalyst component (α1) as prepared above were added thereto, and the internal temperature of the polymerization vessel was rapidly elevated to 70° C. After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 1.

Example 2

(Production of Solid Titanium Catalyst Component (α2))

In the same manner as in Example 1 except that diethyl 4-methylcyclohexane-1,2-dicarboxylate (a mixture of a cis-isomer and a trans-isomer) was used instead of diisobutyl 4-methylcyclohexane-1,2-dicarboxylate (a mixture of a cis-isomer and a trans-isomer), a solid titanium catalyst component (α2) was obtained.

(Polymerization)

In the same manner as in Example 1 except that the solid titanium catalyst component (α1) was used instead of the solid titanium catalyst component (α2), the propylene polymerization was carried out. The results were shown in Table 1.

Example 3

(Production of Solid Titanium Catalyst Component (α3))

In the same manner as in Example 1 except that a cis-isomer of diethyl 4-methyl-4-cyclohexene-1,2-dicarboxylate was used instead of diisobutyl 4-methylcyclohexane-1,2-dicarboxylate (a mixture of a cis-isomer and a trans-isomer), a solid titanium catalyst component (α3) was obtained.

(Polymerization)

In the same manner as in Example 1 except that the solid titanium catalyst component (α3) was used, the propylene polymerization was carried out. The results were shown in Table 1.

Example 4

(Production of Solid Titanium Catalyst Component (α4))

In the same manner as in Example 1 except that di-n-octyl 3-methyl-4-cyclohexene-1,2-dicarboxylate (a mixture of a trans-isomer and a cis-isomer) was used instead of diisobutyl 4-methylcyclohexane-1,2-dicarboxylate (a mixture of a cis-isomer and a trans-isomer), a solid titanium catalyst component (α4) was obtained.

(Polymerization)

In the same manner as in Example 1 except that the solid titanium catalyst component (α4) was used, the propylene polymerization was carried out. The results were shown in Table 1.

Example 5

(Production of Solid Titanium Catalyst Component (α5))

In the same manner as in Example 1 except that a mixture of diisobutyl 3-methyl-4-cyclohexene-1,2-dicarboxylate and diisobutyl 4-methyl-4-cyclohexene-1,2-dicarboxylate was used instead of diisobutyl 4-methylcyclohexane-1,2-dicarboxylate (a mixture of a cis-isomer and a trans-isomer), a solid titanium catalyst component (α5) was obtained.

(Polymerization)

In the same manner as in Example 1 except that the solid titanium catalyst component (α5) was used, the propylene polymerization was carried out. The results were shown in Table 1.

Example 6

(Production of Solid Titanium Catalyst Component (α6))

In the same manner as in Example 1 except that di-n-octyl 3-methyl-4-cyclohexene-1,2-dicarboxylate and di-n-octyl 4-methyl-4-cyclohexene-1,2-dicarboxylate were used instead of diisobutyl 4-methylcyclohexane-1,2-dicarboxylate (a mixture of a cis-isomer and a trans-isomer), solid titanium catalyst component (α6) was obtained.

(Polymerization)

In the same manner as in Example 1 except that the solid titanium catalyst component (α6) was used, the propylene polymerization was carried out. The results were shown in Table 1.

Example 7

(Production of Solid Titanium Catalyst Component (α7))

In the same manner as in Example 1 except that diisobutyl norbornane-1,2-dicarboxylate was used instead of diisobutyl 4-methylcyclohexane-1,2-dicarboxylate (a mixture of a cis-isomer and a trans-isomer), a solid titanium catalyst component (α7) was obtained.

(Polymerization)

In the same manner as in Example 1 except that the solid titanium catalyst component (α7) was used, the propylene polymerization was carried out. The results were shown in Table 1.

Example 8

(Production of Solid Titanium Catalyst Component (α8))

In the same manner as in Example 1 except that diisobutyl 3,6-diphenylcyclohexane-1,2-dicarboxylate was used instead of diisobutyl 4-methylcyclohexane-1,2-dicarboxylate (a mixture of a cis-isomer and a trans-isomer), a solid titanium catalyst component (α8) was obtained.

(Polymerization)

In the same manner as in Example 1 except that the solid titanium catalyst component (α8) was used, the propylene polymerization was carried out. The results were shown in Table 1.

Example 9

(Production of Solid Titanium Catalyst Component (α9))

In the same manner as in Example 1 except that diisobutyl 3-methylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α9) was obtained.

(Polymerization)

In the same manner as in Example 1 except that the solid titanium catalyst component (α9) was used, the propylene polymerization was carried out. The results were shown in Table 1.

Example 10

(Production of Solid Titanium Catalyst Component (α10))

In the same manner as in Example 1 except that di-n-octyl 3-methylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α10) was obtained.

(Polymerization)

In the same manner as in Example 1 except that the solid titanium catalyst component (α10) was used, the propylene polymerization was carried out. The results were shown in Table 1.

Example 11

(Production of Solid Titanium Catalyst Component (α11))

In the same manner as in Example 1 except that diisobutyl 3,6-dimethylcyclohexane-1,2-dicarboxylate (content of a trans-isomer: 74%) was used instead of diisobutyl 4-methylcyclohexane-1,2-dicarboxylate (a mixture of a cis-isomer and a trans-isomer), a solid titanium catalyst component (α11) was obtained.

(Polymerization)

In the same manner as in Example 1 except that the solid titanium catalyst component (α11) was used, the propylene polymerization was carried out. The results were shown in Table 1.

Example 12

(Production of Solid Titanium Catalyst Component (α12))

In the same manner as in Example 1 except that di-n-octyl 3,6-dimethylcyclohexane-1,2-dicarboxylate (a cis-isomer) was used instead of diisobutyl 4-methylcyclohexane-1,2-dicarboxylate (a mixture of a cis-isomer and a trans-isomer), a solid titanium catalyst component (α12) was obtained.

(Polymerization)

In the same manner as in Example 1 except that the solid titanium catalyst component (α12) was used, the propylene polymerization was carried out. The results were shown in Table 1.

Example 13

(Production of Solid Titanium Catalyst Component (α13))

In the same manner as in Example 1 except that diisobutyl 3-methyl-6-n-propylcyclohexane-1,2-dicarboxylate was used instead of diisobutyl 4-methylcyclohexane-1,2-dicarboxylate (a mixture of a cis-isomer and a trans-isomer), a solid titanium catalyst component (α13) was obtained.

(Polymerization)

In the same manner as in Example 1 except that the solid titanium catalyst component (α13) was used, the propylene polymerization was carried out. The results were shown in Table 1.

Comparative Example 1

(Synthesis of Solid Titanium Catalyst Component (β1))

In the same manner as in Example 1 except that diisobutyl phthalate (reagent of special grade, manufactured by Wako Pure Chemicals Co., Ltd.) was used instead of diisobutyl 4-methylcyclohexane-1,2-dicarboxylate (a mixture of a cis-isomer and a trans-isomer), a solid titanium catalyst component (β1) was obtained.

(Polymerization)

In the same manner as in Example 1 except that the solid titanium catalyst component (β1) was used, the propylene polymerization was carried out. The results were shown in Table 1.

Comparative Example 2

(Synthesis of diethyl 2,3-diisopropylsuccinate)

In the same manner as described in the Patent Document 5, diethyl 2,3-diisopropylsuccinate was synthesized.

(Synthesis of Solid Titanium Catalyst Component (β2))

In the same manner as in Example 1 except that diethyl 2,3-diisopropylsuccinate was used instead of diisobutyl 4-methylcyclohexane-1,2-dicarboxylate (a mixture of a cis-isomer and a trans-isomer), a solid titanium catalyst component (β2) was obtained.

(Polymerization)

In the same manner as in Example 1 except that the solid titanium catalyst component (β2) and 1.6 NL of hydrogen were used, the propylene polymerization was carried out. The results were shown in Table 1.

Comparative Example 3

(Production of Solid Titanium Catalyst Component (β3))

In the same manner as in Example 1 except that a trans-isomer of diisobutyl cyclohexane-1,2-dicarboxylate was used instead of diisobutyl 4-methylcyclohexane-1,2-dicarboxylate (a mixture of a cis-isomer and a trans-isomer), a solid titanium catalyst component (β3) was obtained.

(Polymerization)

In the same manner as in Example 1 except that the solid titanium catalyst component (β3) was used, the propylene polymerization was carried out. The results were shown in Table 1.

TABLE 1

|  |  | Activity kg-PP/g-Cat | MFR g/10 min | Content of Decane-insoluble components wt % | Bulk specific Gravity g/ml | Mw/Mn | Mz/Mw | Al/Ti m.r. | Polymerization |
| --- | --- | --- | --- | --- | --- | --- | --- | --- | --- |
| Ex. 1 | Diisobutyl 4-methylcyclohexane-1,2-dicarboxylate (mixture of cis-isomer and trans-isomer) | 17.7 | 11.2 | 92.8 | 0.42 | 11.5 | 4.8 | 125 | bulk |
| Ex. 2 | Diethyl 4-methylcyclohexane-1,2-dicarboxylate (mixture of cis-isomer and trans-isomer) | 18.5 | 10.1 | 93.3 | 0.44 | 9.6 | 4.3 | 125 | bulk |
| Ex. 3 | diethyl 4-methyl-4-cyclohexene-1,2-dicarboxylate (cis-isomer) | 12.1 | 14.0 | 92.4 | 0.42 | 6.0 | 5.1 | 125 | bulk |
| Ex. 4 | Di-n-octyl 3-methyl-4-cyclohexene-1,2-dicarboxylate (mixture of cis-isomer and trans-isomer) | 20.2 | 7.6 | 93.9 | 0.41 | 9.2 | 6.9 | 125 | bulk |
| Ex. 5 | Diisobutyl 3-methyl-4-cyclohexene-1,2-dicarboxylate, and diisobutyl 4-methyl-4-cyclohexene-1,2-dicarboxylate | 7.5 | 12.0 | 92.2 | 0.42 | 7.4 | 7.5 | 125 | bulk |
| Ex. 6 | Di-n-octyl 3-methyl-4-cyclohexene-1,2-dicarboxylate, and di-n-octyl 4-methyl-4-cyclohexene-1,2-dicarboxylate | 16.4 | 12.5 | 91.0 | 0.41 | 9.4 | 4.9 | 125 | bulk |
| Ex. 7 | Diisobutyl norbornane-2,3-dicarboxylate | 15.0 | 16.0 | 93.5 | 0.50 | 7.8 | 4.7 | 125 | bulk |
| Ex. 8 | Diisobutyl 3,6-diphenylcyclohexane-1,2-dicarboxylate | 19.9 | 13.5 | 91.9 | 0.49 | 7.8 | 4.1 | 125 | bulk |
| Ex. 9 | Diisobutyl 3-methylcyclohexane-1,2-dicarboxylate (cis-isomer) | 16.7 | 6.6 | 93.5 | 0.43 | 19.5 | 7.9 | 125 | bulk |
| Ex. 10 | Di-n-octyl 3-methylcyclohexane-1,2-dicarboxylate (cis-isomer) | 19.2 | 4.9 | 94.2 | 0.43 | 19.6 | 7.1 | 125 | bulk |
| Ex. 11 | Diisobutyl 3,6-dimethylcyclohexane-1,2-dicarboxylate (content of trans-isomer: 74%) | 25.8 | 2.9 | 97.6 | 0.48 | 18.2 | 6.9 | 125 | bulk |
| Ex. 12 | Di-n-octyl 3,6-dimethylcyclohexane-1,2-dicarboxylate (cis-isomer) | 20.7 | 11.5 | 92.9 | 0.42 | 13.1 | 8.3 | 125 | bulk |
| Ex. 13 | Diisobutyl 3-methyl-6-n-propylcyclohexane-1,2-dicarboxylate | 28.9 | 2.6 | 97.7 | 0.42 | 15.7 | 13.6 | 125 | bulk |
| Comp. Ex. 1 | Diisobutyl phthalate | 22.1 | 5.0 | 98.5 | 0.49 | 4.3 | 3.0 | 125 | bulk |
| Comp. Ex. 2 | Diethyl 2,3-diisopropylsuccinate | 39.7 | 5.6 | 97.2 | 0.39 | 8.6 | 4.4 | 125 | bulk |
| Comp. Ex. 3 | Diisobutyl cyclohexane-1,2-dicarboxylate (trans-isomer) | 29.8 | 4.6 | 97.0 | 0.42 | 6.9 | 4.6 | 125 | bulk |

The results of the measurement of melt tension were shown in Table 2. It can be seen that PP of Comparative Example 2 has a lower melt tension, as compared with that of Example 11. Further, the threads obtained upon measurement of melt tension of the polymers obtained in Comparative Examples 2 and 3 were weak, and thus troubles such as thread breakages or moving away from the pulley easily occurred.

TABLE 2

| | Melt tension/g Receiving speed/(m/min) | | | |
|---|---|---|---|---|
| | 15 | 25 | 45 | 75 |
| Example 11 | 1.1 | 1.2 | 1.2 | 1.3 |
| Comparative Example 2 | 0.9 | 0.7 | Thread breakage | Thread breakage |
| Comparative Example 3 | 1.0 | 1.0 | 0.9 | 1.1 |

Example 14

(Prepolymerization)

To a 200 ml four-necked glass reactor equipped with a stirrer, 50 ml of purified hexane, 1.0 mmol of triethylaluminum, and 0.5 mmol of the solid titanium catalyst (α13) in terms of titanium atom were added under the nitrogen atmosphere, and then propylene was supplied to the reactor at a rate of 1.6 litter/hour for 1 hour. The temperature was maintained at 20° C.

The reactor inside was purged with nitrogen when the supply of propylene is completed, washing which includes removing the supernatant solution and adding the purified hexane was carried out twice, thereafter the resultant was re-suspended in purified decane, and all of the solution was transferred into a catalyst bottle to obtain a prepolymerization catalyst (α14).

(Polymerization)

To a polymerization reactor having an internal volume of 1 litter which had been thoroughly purged with nitrogen, 400 ml of purified heptane was charged at room temperature, and then 0.4 mmol of triethylaluminum, 0.08 mmol of cyclohexylmethyldimethoxysilane, and 0.008 mmol of the prepolymerization catalyst (α14) in terms of titanium atom were added thereto at 40° C., under a propylene atmosphere. Subsequently, the temperature was elevated to 60° C., 100 ml of hydrogen was added and the temperature was further elevated to 80° C., and then the propylene polymerization was carried out for 1 hour.

After completing the polymerization, the slurry including the purified solid was filtered, and dried overnight under reduced pressure at 80° C. The results are shown in Table 3 and FIG. 1.

Example 15

(Polymerization)

In the same manner as in Example 14 except that 200 ml of hydrogen was used, the propylene polymerization was carried out. The results were shown in Table 3 and FIG. 1.

Example 16

(Polymerization)

In the same manner as in Example 14 except that 750 ml of hydrogen was used, the propylene polymerization was carried out. The results were shown in FIG. 1.

Example 17

(Solid Titanium Catalyst Component)

In the same manner as in Example 13 except that the temperature was maintained at 100° C. instead of 120° C., and the temperature was maintained at 100° C., instead of 130° C., a solid titanium catalyst component (α17) was obtained.

(Prepolymerization)

In the same manner as in Example 14 except that the solid titanium catalyst component (α17) was used instead of the solid titanium catalyst component (α13), the prepolymerization was carried out to obtain a prepolymerization catalyst (α17).

(Polymerization)

Figure 2:
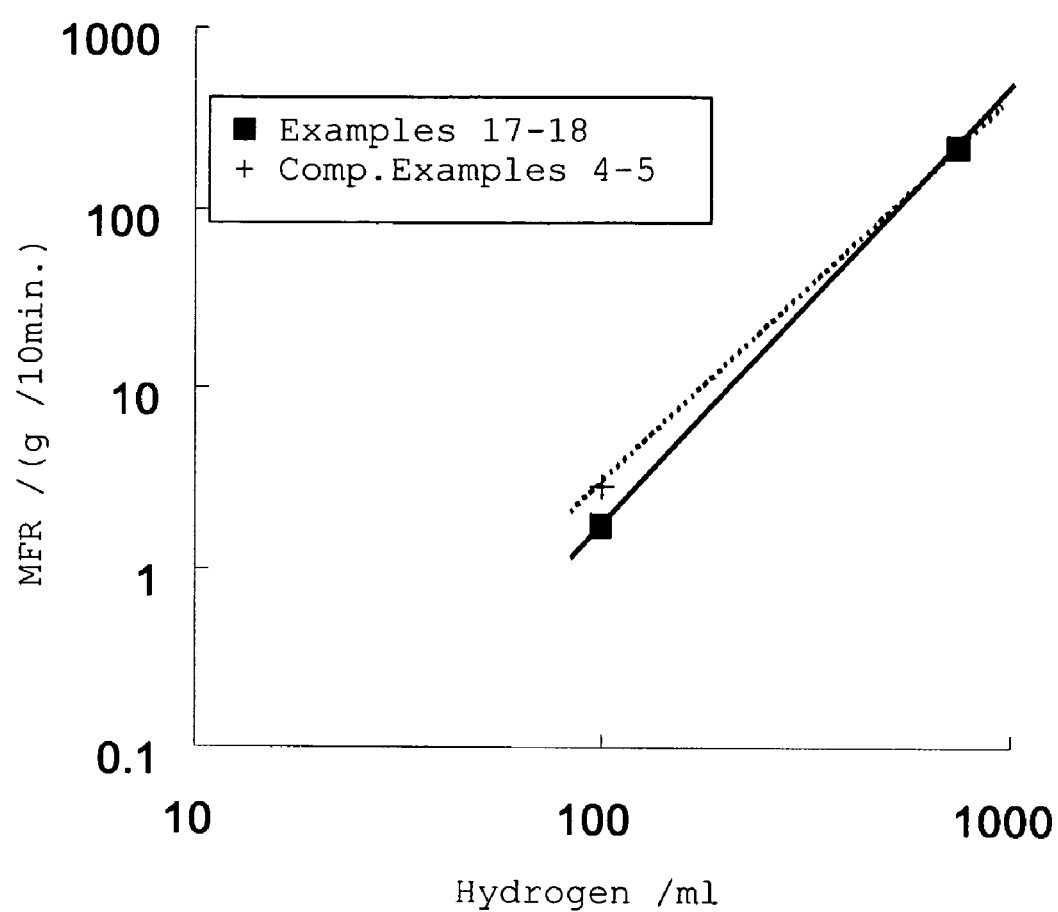
FIG. 2 shows the relationship between the used amount of hydrogen and MFR.

In the same manner as in Example 14 except that the prepolymerization catalyst (α17) was used, the propylene polymerization was carried out. The results were shown in Table 3 and FIG. 2.

Example 18

(Polymerization)

In the same manner as in Example 17 except that 750 ml of hydrogen was used, the propylene polymerization was carried out. The results were shown in Table 3 and FIG. 2.

Example 19

(Prepolymerization)

In the same manner as in Example 14 except that the solid titanium catalyst component (α12) was used instead of the solid titanium catalyst component (α13), the prepolymerization was carried out to obtain a prepolymerization catalyst (α19).

(Polymerization)

Figure 3:
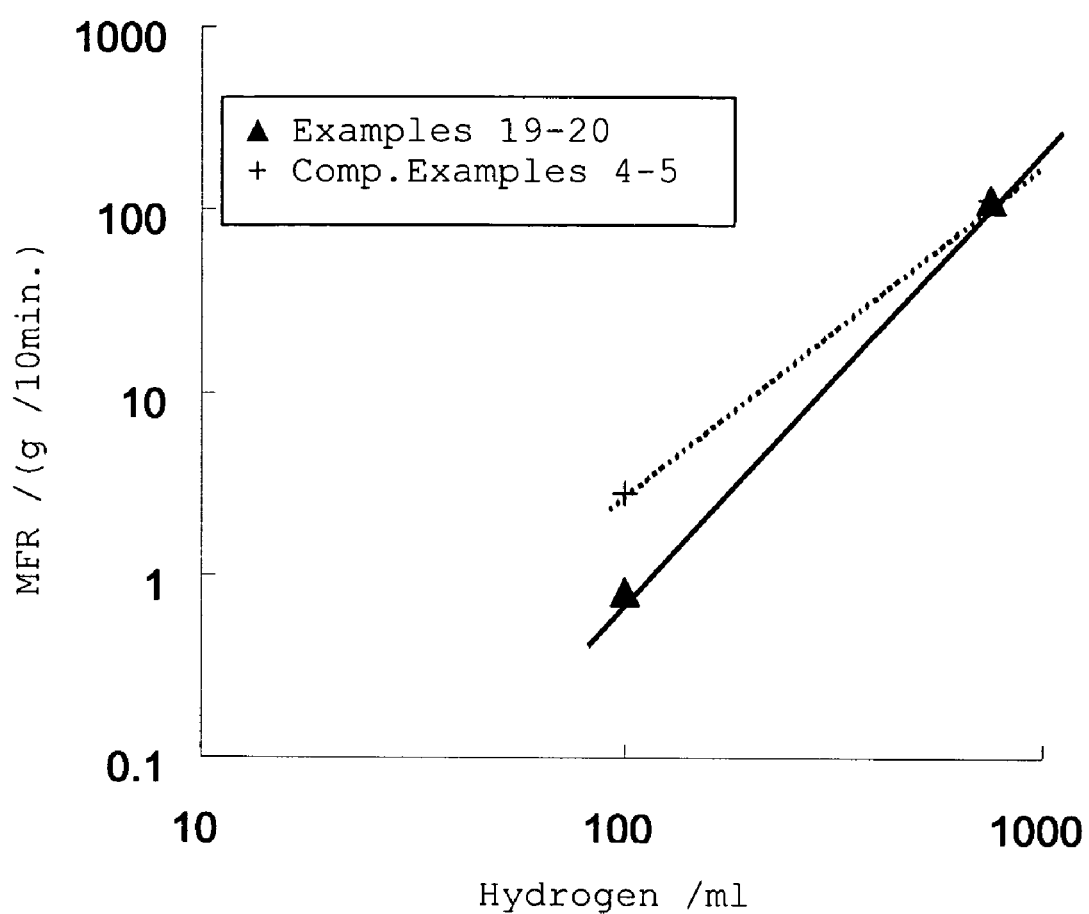
FIG. 3 shows the relationship between the used amount of hydrogen and MFR.

In the same manner as in Example 14 except that the prepolymerization catalyst (α19) was used, the propylene polymerization was carried out. The results were shown in Table 3 and FIG. 3.

Example 20

Polymerization

In the same manner as in Example 19 except that 750 ml of hydrogen was used, the propylene polymerization was carried out. The results were shown in Table 3 and FIG. 3.

Example 21

(Solid Titanium Catalyst Component)

In the same manner as in Example 12 except that the temperature was maintained at 100° C. instead of 120° C., and the temperature was maintained at 100° C. instead of 130° C., a solid titanium catalyst component (α21) was obtained.

(Prepolymerization)

In the same manner as in Example 14 except that the solid titanium catalyst component (α21) was used instead of the solid titanium catalyst component (α13), the prepolymerization was carried out to obtain a prepolymerization catalyst (α21).

(Polymerization)

Figure 4:
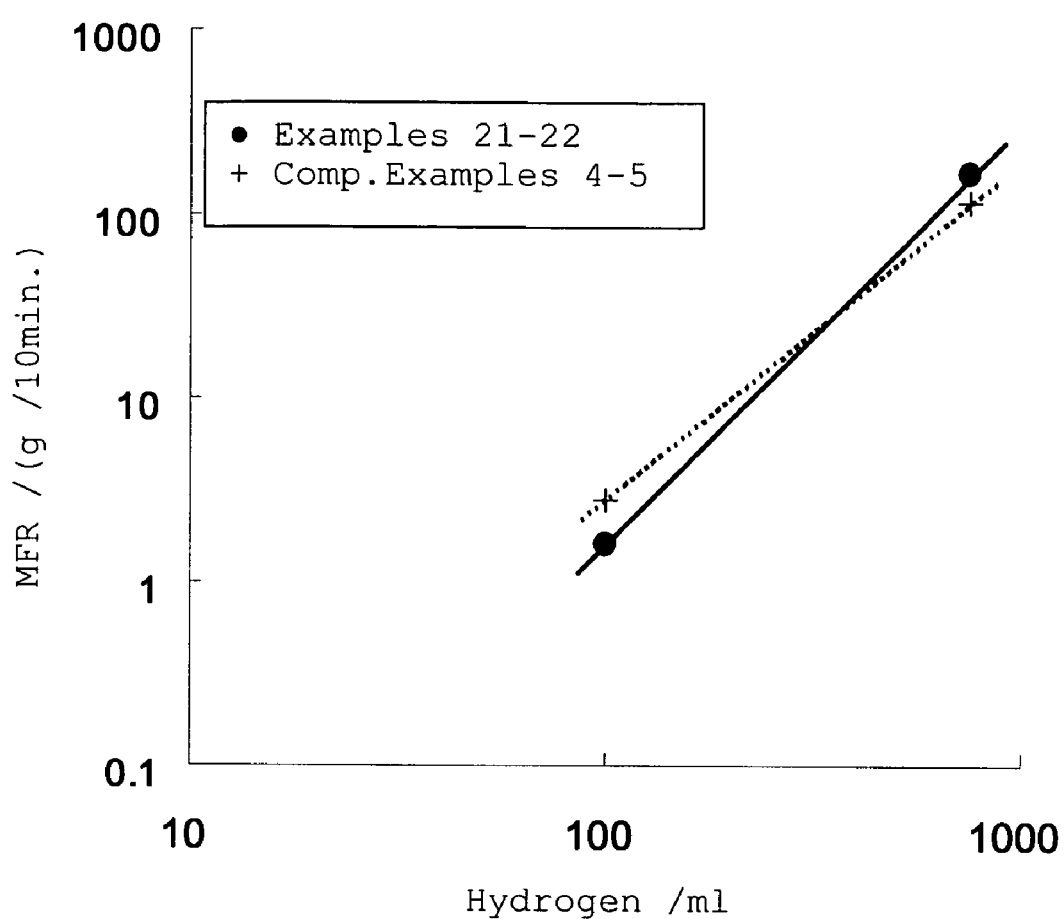
FIG. 4 shows the relationship between the used amount of hydrogen and MFR.

In the same manner as in Example 14 except that the prepolymerization catalyst (α21) was used, the propylene polymerization was carried out. The results were shown in Table 3 and FIG. 4.

Example 22

(Polymerization)
In the same manner as in Example 21 except that 750 ml of hydrogen was used, the propylene polymerization was carried out. The results were shown in Table 3 and FIG. 4.

Comparative Example 4

(Synthesis of Solid Titanium Catalyst Component (β4))
In the same manner as in Example 1 except that diisobutyl cyclohexane-1,2- dicarboxylate (trans-isomer: 78%) was used instead of diisobutyl 4-methylcyclohexane-1,2-dicarboxylate (a mixture of a cis-isomer and a trans-isomer), a solid titanium catalyst component (β4) was obtained.
(Prepolymerization)
In the same manner as in Example 14 except that the solid titanium catalyst component (β4) was used instead of the solid titanium catalyst component (α13), the prepolymerization was carried out to obtain a prepolymerization catalyst (β4).
(Polymerization)
In the same manner as in Example 8 except that the prepolymerization catalyst (β4) was used, the propylene polymerization was carried out. The results were shown in Table 3 and FIGS. 1 to 4.

Comparative Example 5

(Polymerization)
In the same manner as in Comparative Example 4 except that 750 ml of hydrogen was used, the propylene polymerization was carried out. The results were shown in Table 3 and FIGS. 1 to 4.

As described above, it can be seen that when the catalyst for olefin polymerization containing the solid titanium catalyst component according to the invention is used, an olefin polymer having a broader molecular weight distribution can be obtained as compared with the case of using the conventionally used catalyst for olefin polymerization containing the solid titanium catalyst component in Comparative Examples. Such olefin polymer is also advantageous in obtaining a resin having high melt flowability that is recently desired in the application, for example, of the injection molding for automobiles.

The relationships between the used amount of hydrogen and MFR in the above results are shown in FIGS. 1 to 4. It has been known by the person skilled in the art that the relationship between the used amount of hydrogen and MFR shows an excellent linear relationship when respective logarithms are plotted on a graph. It is shown that when the multi-stage polymerization is carried out for the purpose of further broadening the molecular weight distribution, a catalyst giving a steep slope on the graph can significantly change the molecular weight with a small change in the used amount of hydrogen, meaning to be advantageous in broadening the molecular weight distribution.

When the solid titanium catalyst component which contains a cyclic ester compound having a substituent in the cyclic backbone is used, the slope indicating the relationship between the used amount of hydrogen and MFR is more steep as compared with the case of using the solid titanium catalyst component which contains a cyclic ester compound having no substituent in the cyclic backbone. Thus, it can be under-

TABLE 3

| | | Activity kg-PP/g-Cat | Hydrogen usage ml | MFR g/10 min | Content of Decane-insoluble components wt % | Bulk specific Gravity g/ml | Mw/Mn | Mz/Mw | Al/Ti m.r. | Polymerization |
|---|---|---|---|---|---|---|---|---|---|---|
| Ex. 14 | Diisobutyl 3-methyl-6-n-propylcyclohexane-1,2-dicarboxylate | 11.2 | 100 | 1.3 | 97.7 | 0.45 | 13.4 | 23.4 | 50 | heptane slurry |
| Ex. 15 | Diisobutyl 3-methyl-6-n-propylcyclohexane-1,2-dicarboxylate | 12.6 | 200 | 4.3 | 97.4 | 0.44 | — | — | 50 | heptane slurry |
| Ex. 16 | Diisobutyl 3-methyl-6-n-propylcyclohexane-1,2-dicarboxylate | 9.1 | 750 | 140 | 95.6 | 0.43 | — | — | 50 | heptane slurry |
| Ex. 17 | Diisobutyl 3-methyl-6-n-propylcyclohexane-1,2-dicarboxylate | 9.6 | 100 | 1.7 | 97.9 | 0.47 | 10.1 | 7.2 | 50 | heptane slurry |
| Ex. 18 | Diisobutyl 3-methyl-6-n-propylcyclohexane-1,2-dicarboxylate | 7.9 | 750 | 220 | 95.7 | 0.44 | — | — | 50 | heptane slurry |
| Ex. 19 | Di-n-octyl 3,6-dimethyl cyclohexane-1,2-dicarboxylate (cis-isomer) | 9.3 | 100 | 0.8 | 98.1 | 0.49 | 13.0 | 6.9 | 50 | heptane slurry |
| Ex. 20 | Di-n-octyl 3,6-dimethyl cyclohexane-1,2-dicarboxylate (cis-isomer) | 7.4 | 750 | 115 | 95.8 | 0.47 | — | — | 50 | heptane slurry |
| Ex. 21 | Di-n-octyl 3,6-dimethyl cyclohexane-1,2-dicarboxylate (cis-isomer) | 8.4 | 100 | 1.6 | 98.0 | 0.46 | 10.3 | 9.5 | 50 | heptane slurry |
| Ex. 22 | Di-n-octyl 3,6-dimethyl cyclohexane-1,2-dicarboxylate (cis-isomer) | 6.1 | 750 | 165 | 95.9 | 0.43 | — | — | 50 | heptane slurry |
| Comp. Ex. 4 | Diisobutyl cyclohexane-1,2-dicarboxylate | 8.6 | 100 | 2.8 | 98.0 | 0.47 | 8.7 | 5.3 | 50 | heptane slurry |
| Comp. Ex. 5 | Diisobutyl cyclohexane-1,2-dicarboxylate | 6.6 | 750 | 115 | 98.0 | 0.47 | — | — | 50 | heptane slurry | stood to be advantageous particularly in further broadening the molecular weight distribution in the multi-stage polymerization.

It can be seen that polypropylene obtained by using the solid titanium catalyst component, the catalyst for olefin polymerization and the process for producing an olefin polymer of the invention is a polymer having a broad molecular weight distribution. In particular, it is characterized that when comparing the PP's having almost the same MFR values with each other, the Mz/Mw values are high, which shows high contents of the high molecular weight components. In addition, it is advantageous in obtaining an olefin polymer having a broad molecular weight distribution, in which the change in melt flow rate values relative to the change in used amount of hydrogen is significant, in producing the olefin polymer.

Above all, when using the solid titanium catalyst component comprising a cyclic diester compound having a dicarboxylic acid diester group on the 1-position and the 2-position, and a substituent on the 3-position, a polymer having an extremely high Mw/Mn value is obtained. In particular, it can be seen that the polymer obtained by using the solid titanium catalyst component comprising cyclohexane-1,2-dicarboxylic acid diester (corresponding to the compound of the above-described formula (1b)) having a substituent on the 3-position and the 6-position exhibited extremely high Mw/Mn values and Mz/Mw values, and the activity of the catalyst and the stereoregularity of the obtained polymer are high.

What is claimed is:

1. A solid titanium catalyst component (I), comprising titanium, magnesium, halogen, and a cyclic ester compound (a) represented by the following formula (1b):

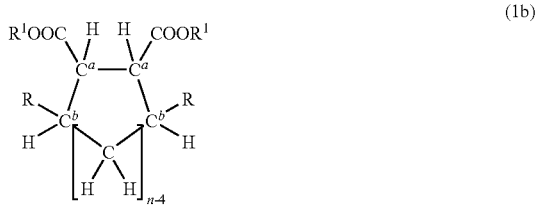

wherein n is an integer of 5 to 10;
bonds between the carbon atoms in the cyclic backbone are all single bonds;
a plurality of $R^1$'s are each independently a monovalent hydrocarbon group having 1 to 20 carbon atoms;
a plurality of R's are each independently an atom or group selected from hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and they may be bonded to each other to form a ring, but at least one of R's is not a hydrogen atom; and
a double bond may be contained in the backbone of the ring formed by the bonding of R's, and in the case where two $C^a$'s are contained in the backbone of the ring, the backbone of the ring have 5 to 10 carbon atoms.

2. The solid titanium catalyst component (I) according to claim 1, wherein in the formula (1b), the cyclic backbone has 6 carbon atoms.

3. The solid titanium catalyst component (I) according to claim 1, further comprising an aromatic carboxylic acid ester and/or a compound having two or more ether linkages through a plurality of carbon atoms.

4. A catalyst for olefin polymerization, comprising the solid titanium catalyst component (I) of claim 1, and an organometallic compound catalyst component (II) containing a metal element selected from Groups I, II and XIII of the periodic table.

5. The catalyst for olefin polymerization according to claim 4, further comprising an electron donor (III).

6. A process for producing an olefin polymer, comprising polymerizing an olefin in the presence of the catalyst for olefin polymerization of claim 5.

7. A process for producing an olefin polymer, comprising polymerizing an olefin in the presence of the catalyst for olefin polymerization of claim 4.

8. The solid titanium catalyst component (I) according to claim 1, wherein, in the formula (1b),
a plurality of R's are each independently an atom or group selected from hydrogen atom, an aliphatic hydrocarbon group having 1 to 20 carbon atoms, a halogen atom, nitrogen-containing group, an oxygen-containing group, a phosphorus-containing group, a halogen-containing group and a silicon-containing group, but at least one of R's is not hydrogen atom.

9. The solid titanium catalyst component (I) according to claim 8, wherein a plurality of R's are each independently an atom or group selected from hydrogen atom, an aliphatic hydrocarbon group having 1 to 20 carbon atoms, but at least one of R's is not a hydrogen atom.

* * * * *